United States Patent
Oyama et al.

(10) Patent No.: US 10,439,732 B2
(45) Date of Patent: Oct. 8, 2019

(54) RECEIVING DEVICE AND PHASE-ERROR COMPENSATION METHOD

(71) Applicant: FUJITSU LIMITED, Kawasaki-shi, Kanagawa (JP)

(72) Inventors: Tomofumi Oyama, Kawasaki (JP); Takeshi Hoshida, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/685,205

(22) Filed: Aug. 24, 2017

(65) Prior Publication Data

US 2018/0076903 A1 Mar. 15, 2018

(30) Foreign Application Priority Data

Sep. 9, 2016 (JP) ................. 2016-177088

(51) Int. Cl.
*H04B 10/61* (2013.01)
*H04B 10/077* (2013.01)
*H04B 10/63* (2013.01)

(52) U.S. Cl.
CPC ..... *H04B 10/6165* (2013.01); *H04B 10/0779* (2013.01); *H04B 10/63* (2013.01); *H04B 2210/074* (2013.01)

(58) Field of Classification Search
CPC ................................................ H04B 10/6165
USPC ....................................................... 375/332
See application file for complete search history.

(56) References Cited

U.S. PATENT DOCUMENTS

| 5,084,902 A | * | 1/1992 | Aotani | ...................... H03L 7/00 327/244 |
| 2011/0274442 A1 | | 11/2011 | Zhang et al. | |
| 2013/0089342 A1 | * | 4/2013 | Oveis Gharan | .... H04B 10/6165 398/208 |
| 2014/0010532 A1 | | 1/2014 | Zhang et al. | |

FOREIGN PATENT DOCUMENTS

JP 2013-530619 7/2013
WO 2012132103 10/2012

* cited by examiner

*Primary Examiner* — Lihong Yu
(74) *Attorney, Agent, or Firm* — Fujitsu Patent Center

(57) ABSTRACT

A receiving device receives a received signal in which a data signal, modulated by using a phase modulation method, and a pilot signal are time-multiplexed. The receiving device includes a synchronizing circuit that synchronizes the phase of the received signal. The synchronizing circuit extracts a pilot signal from the received signal. The synchronizing circuit estimates a phase error by comparing the extracted pilot signal and a predetermined pattern. The synchronizing circuit conducts phase rotation on constellation points of the received signal in accordance with the reference phase, obtained from the phase error, and the phase in the modulation method related to the received signal. The synchronizing circuit estimates a phase estimate value of the received signal in accordance with the constellation points, on which phase rotation has been conducted. The synchronizing circuit compensates for a phase error of the received signal in accordance with the phase estimate value.

6 Claims, 24 Drawing Sheets

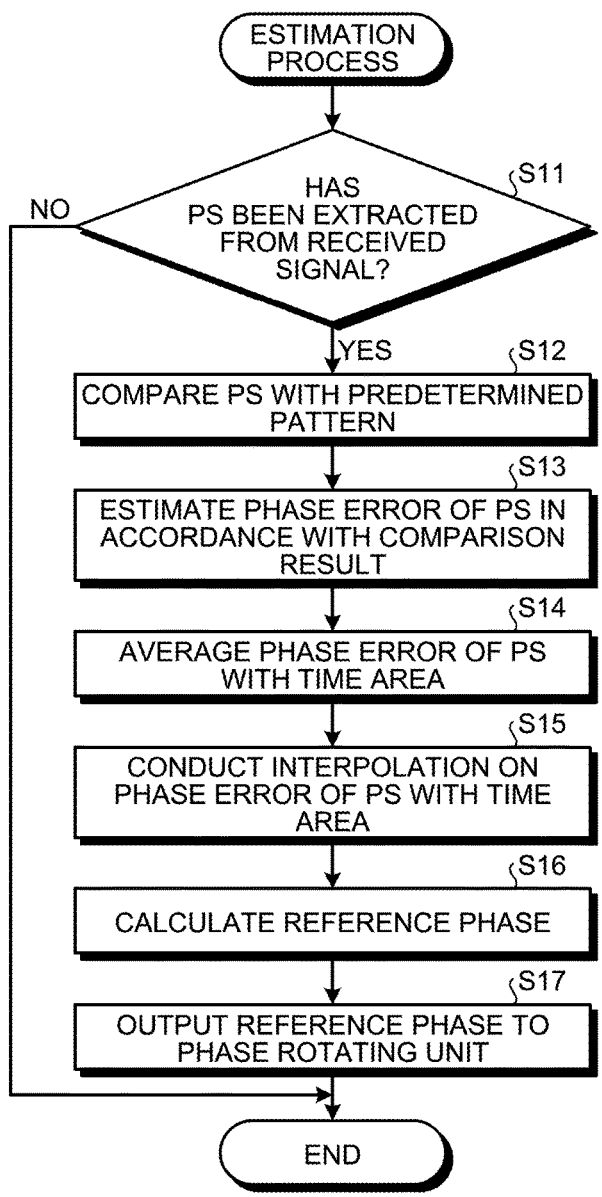

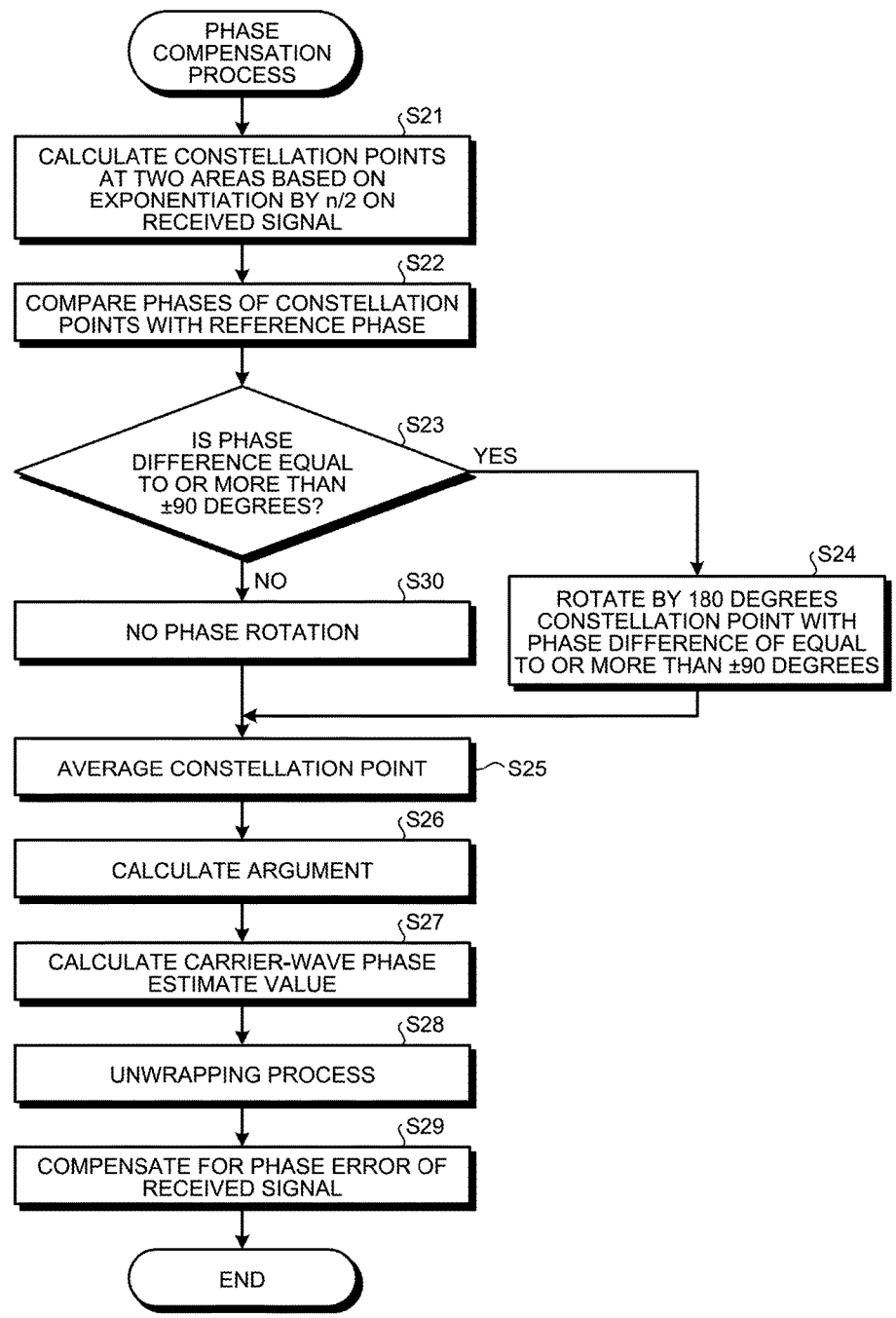

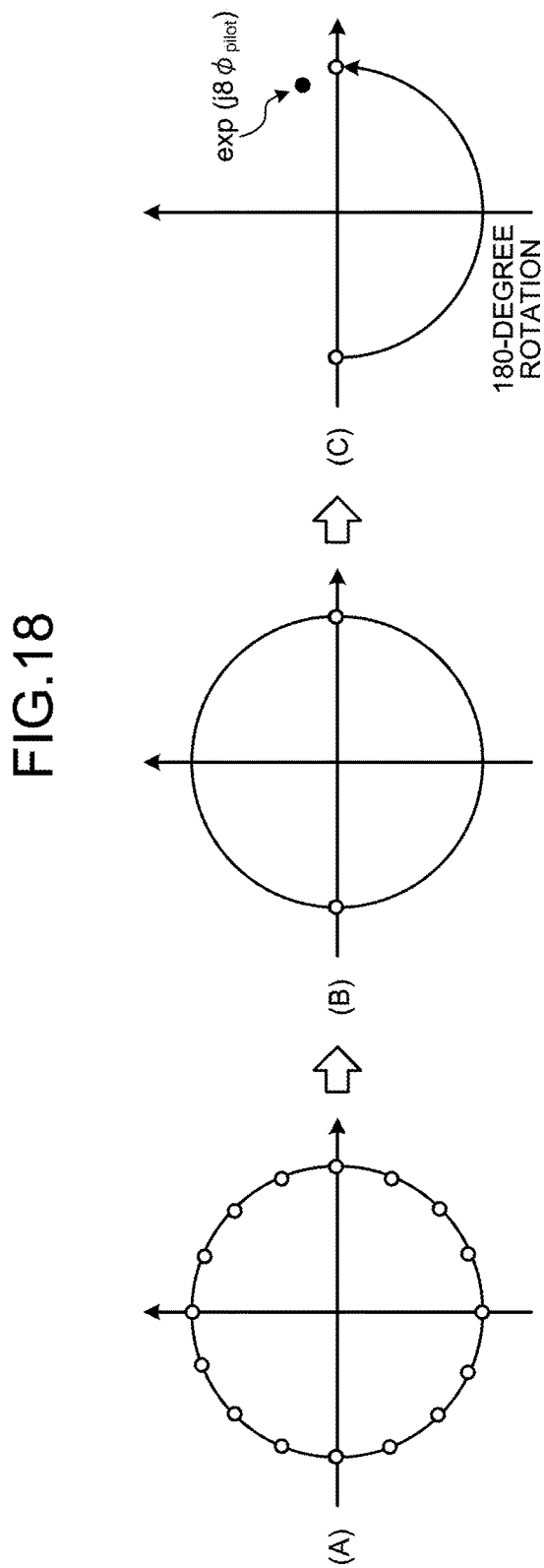

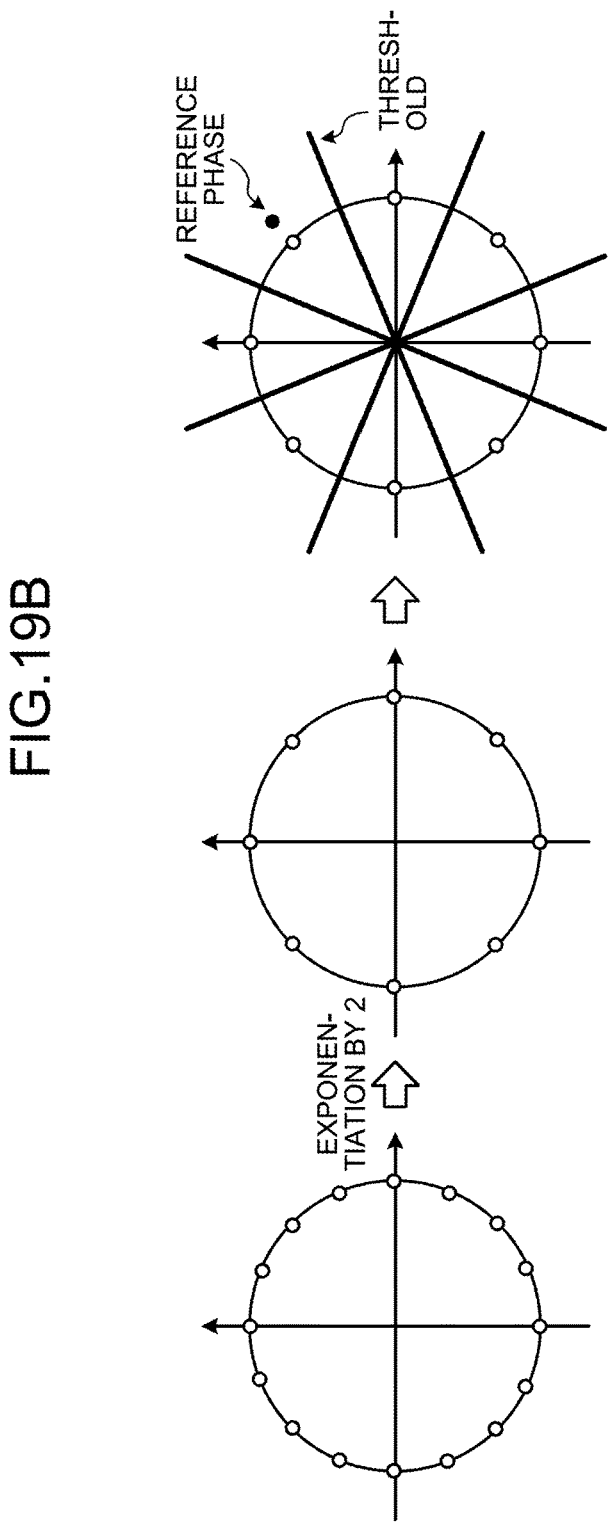

RECEIVING DEVICE AND PHASE-ERROR COMPENSATION METHOD

CROSS-REFERENCE TO RELATED APPLICATION

This application is based upon and claims the benefit of priority of the prior Japanese Patent Application No. 2016-177088, filed on Sep. 9, 2016, the entire contents of which are incorporated herein by reference.

FIELD

The embodiments discussed herein are related to a receiving device and a phase-error compensation method.

BACKGROUND

With regard to for example optical transmission systems that are used for long-range communications, such as 40 Gbps (bits per second) or 100 Gbps, digital-coherent receiving devices that use a phase modulation method, such as Quadrature Phase Shift Keying (QPSK), have been known in recent years. The receiving device causes the received signal to interfere with local oscillator light so as to acquire a primary optical signal and performs digital signal processing on the acquired primary optical signal.

For example, a digital signal processor (DSP) in the receiving device compensates for distortion that occurs in an optical transmission path, distortion due to incompleteness of a communication device, or the like, through digital signal processing. FIG. 24 is a block diagram that illustrates an example of the functional configuration of the DSP 100.

A DSP 100, illustrated in FIG. 24, includes a chromatic dispersion compensator (CDC) 101, an adaptive equalizer (AEQ) 102, a frequency offset compensator (FOC) 103, and a carrier phase recovery (CPR) 104. The CDC 101 is a wavelength-dispersion compensation circuit that compensates for wavelength dispersion that occurs in an optical transmission path. The AEQ 102 is an equalizing circuit for, for example, polarized-wave separation, band compensation, or linear distortion compensation. For example, the AEQ 102 performs a polarized-wave separation process to adaptively follow time fluctuations, such as polarized-wave fluctuations or polarized-wave mode dispersion, a compensation process to compensate for residual dispersion that has not been compensated during the previous wavelength-dispersion compensation, or a compensation process to compensate for signal band narrowing that occurs in an electric device, an optical device, or the like.

The FOC 103 is a frequency-offset compensation circuit that estimates the difference between the frequency of the light source at the side of the transmitting device and the frequency of the local-oscillator light source at the side of the receiving device and that compensates for the difference. The CPR 104 is a carrier-wave phase synchronizing circuit that compensates for phase noise of the local-oscillator light source or fluctuation components of the high-speed residual frequency offset that has not been compensated by the FOC 103.

The received signal, processed by the DSP 100, contains for example phase errors of the light source at the side of the transmitting device or the local-oscillator light source at the side of the receiving device, or phase errors due to residual frequency offset, or the like, which has not been compensated by the FOC 103. With regard to the CPR 104, as a method for compensating for a phase error of a received signal, Viterbi-Viterbi algorithm, such as exponentiation by n, to remove modulated components by raising the nPSK signal to the power of n, is known.

According to exponentiation by n, the nPSK signal is raised to the power of n to remove phase modulated components, n constellation points on the IQ plane are consolidated into the neighborhood of the single constellation point, and the consolidated constellation point at one area is averaged by multiple symbol numbers so that noise other than phase errors, e.g., gaussian noise, may be reduced. FIG. 25 is an explanatory diagram that illustrates an example of the constellation (there is phase noise) after exponentiation by n on the QPSK signal. The constellation before exponentiation by 4 on the QPSK signal has constellation points at 4 areas on the IQ plane. Each constellation point has a phase error $\phi e$ due to the presence of phase noise. Furthermore, the constellation of the QPSK signal after exponentiation by 4 is in a state where the constellation points at 4 areas on the IQ plane have been consolidated into the neighborhood of the constellation point at one area.

[Patent Literature 1] Japanese National Publication of International Patent Application No. 2013-530619

[Patent Literature 2] International Publication Pamphlet No. 2012/132103

However, in the CPR 104 that uses exponentiation by n, the phase-estimation possible range is limited to $2\pi/n$; therefore, if a phase error of equal to or more than $2\pi/2n$ occurs between successive symbols, a phase error of equal to or more than $\pm 2\pi/n$, i.e., phase slip, occurs. As a result, a burst error occurs in a received signal after the symbol in which the phase slip occurs.

SUMMARY

According to an aspect of an embodiment, a receiving device receives a received signal in which a data signal, modulated by using a phase modulation method or a phase-amplitude modulation method, and a pilot signal are time-multiplexed. The receiving device includes a synchronizing circuit that synchronizes a phase of the received signal. The synchronizing circuit is configured to extract the pilot signal from the received signal. The synchronizing circuit is configured to estimate a phase error by comparing the extracted pilot signal and a predetermined pattern of the extracted pilot signal. The synchronizing circuit is configured to conduct phase rotation on constellation points of the received signal in accordance with a reference phase obtained from the estimated phase error, and a phase in the modulation method related to the received signal. The synchronizing circuit is configured to estimate a phase estimate value of the received signal in accordance with the constellation point, on which the phase rotation has been conducted. The synchronizing circuit is configured to compensate for a phase error of the received signal in accordance with the estimated phase estimate value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a flowchart that illustrates an example of the procedure of the CPR with regard to an estimation process;

FIG. 8 is a flowchart that illustrates an example of the procedure of the CPR with regard to a phase compensation process;

FIG. 18 is an explanatory diagram that illustrates an example of the transition of the constellation before and after exponentiation by n/2 on the 16PSK signal and before and after phase rotation;

FIG. 19B is an explanatory diagram that illustrates an example of the transition of the constellation before and after exponentiation by n/8 on the 16PSK signal and the reference phase;

DESCRIPTION OF EMBODIMENTS

Preferred embodiments of the present invention will be explained with reference to accompanying drawings. Furthermore, the disclosed technology is not limited to the embodiments. Moreover, each of the embodiments described below may be combined as appropriate to the extent that there is no contradiction.

[a] First Embodiment

Figure 1:
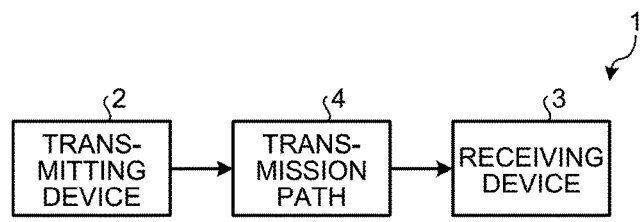
FIG. 1 is an explanatory diagram that illustrates an example of an optical transmission system according to the present embodiment.

FIG. 1 is an explanatory diagram that illustrates an example of an optical transmission system 1 according to the present embodiment. The optical transmission system 1, illustrated in FIG. 1, includes a transmitting device 2, a receiving device 3, and a transmission path 4. The transmitting device 2 and the receiving device 3 are digital-coherent type optical communication devices.

Figure 2:
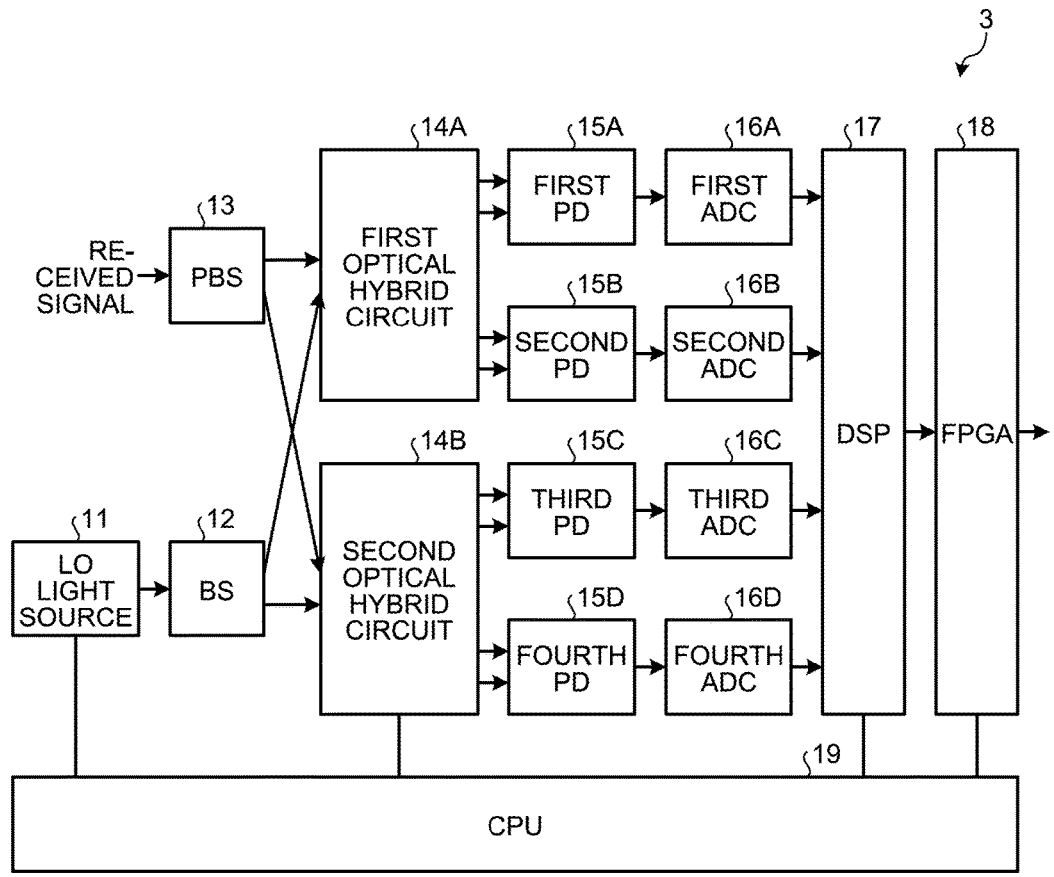
FIG. 2 is a block diagram that illustrates an example of the hardware configuration of a receiving device.

FIG. 2 is a block diagram that illustrates an example of the hardware configuration of the receiving device 3. The receiving device 3, illustrated in FIG. 2, includes an LO light source (local laser diode) 11, a beam splitter (BS) 12, a polarization beam splitter (PBS) 13, and first and second optical hybrid circuits 14A, 14B. The receiving device 3 includes first to fourth photo diodes (PDs) 15A to 15D, first to fourth analog digital converters (ADCs) 16A to 16D, and a digital signal processor (DSP) 17. Furthermore, the receiving device 3 includes a field programmable gate array (FPGA) 18 and a central processing unit (CPU) 19.

The LO light source 11 is for example a laser that generates local oscillator light. The BS 12 splits the local oscillator light from the LO light source 11 and outputs them to the first optical hybrid circuit 14A and the second optical hybrid circuit 14B. The PBS 13 splits a received signal into two polarized states that are orthogonal to each other, e.g., an X polarized-wave component and a Y polarized-wave component. Here, the X polarized-wave component is a horizontal polarized wave component, and the Y polarized-wave component is a vertical polarized wave component. The PBS 13 outputs the X polarized-wave component to the first optical hybrid circuit 14A. Furthermore, the PBS 13 outputs the Y polarized-wave component to the second optical hybrid circuit 14B.

The first optical hybrid circuit 14A causes the X polarized-wave component of the received signal to interfere with the local oscillator light, thereby acquiring the optical signals with the I component and the Q component. Here, the I component is an in-phase axis component, and the Q component is a quadrature axis component. The first optical hybrid circuit 14A outputs the optical signal with the I component, included in the X polarized-wave component, to the first PD 15A. The first optical hybrid circuit 14A outputs the optical signal with the Q component, included in the X polarized-wave component, to the second PD 15B.

The second optical hybrid circuit 14B causes the Y polarized-wave component of the received signal to interfere with the local oscillator light, thereby acquiring the optical signals with the I component and the Q component. The second optical hybrid circuit 14B outputs the optical signal with the I component, included in the Y polarized-wave component, to the third PD 15C. The second optical hybrid circuit 14B outputs the optical signal with the Q component, included in the Y polarized-wave component, to the fourth PD 15D.

The first PD 15A conducts electric conversion on the optical signal with the I component in the X polarized-wave component from the first optical hybrid circuit 14A for gain adjustment and outputs the gain-adjusted electric signal to the first ADC 16A. The first ADC 16A conducts digital conversion on the electric signal with the I component in the X polarized-wave component and outputs it to the DSP 17. The second PD 15B conducts electric conversion on the optical signal with the Q component in the X polarized-wave component from the first optical hybrid circuit 14A for gain adjustment and outputs the gain-adjusted electric signal to the second ADC 16B. The second ADC 16B conducts digital conversion on the electric signal with the Q component in the X polarized-wave component and outputs it to the DSP 17.

The third PD 15C conducts electric conversion on the optical signal with the I component in the Y polarized-wave component from the second optical hybrid circuit 14B for gain adjustment and outputs the gain-adjusted electric signal to the third ADC 16C. The third ADC 16C conducts digital conversion on the electric signal with the I component in the Y polarized-wave component and outputs it to the DSP 17. The fourth PD 15D conducts electric conversion on the optical signal with the Q component in the Y polarized-wave component from the second optical hybrid circuit 14B for gain adjustment and outputs the gain-adjusted electric signal to the fourth ADC 16D. The fourth ADC 16D conducts digital conversion on the electric signal with the Q component in the Y polarized-wave component and outputs it to the DSP 17.

The DSP 17 performs digital signal processing on the I component and the Q component included in the X polarized-wave component and the I component and the Q component included in the Y polarized-wave component, on which digital conversion has been performed, thereby demodulating the X polarized-wave component and the Y polarized-wave component to obtain demodulated signals. The FPGA 18 includes for example an undepicted correcting unit that performs a forward error correction (FEC) process on demodulated signals. The CPU 19 performs overall control of the receiving device 3.

Figure 3:
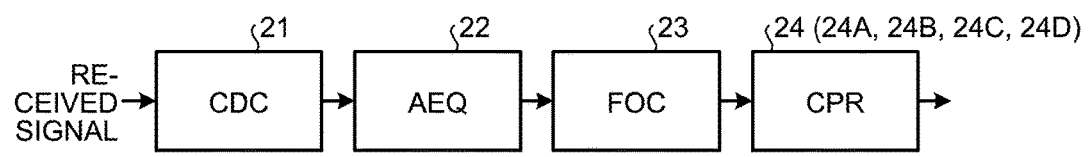
FIG. 3 is a block diagram that illustrates an example of the functional configuration of a DSP in the receiving device.

FIG. 3 is a block diagram that illustrates an example of the functional configuration of the DSP 17 in the receiving device 3. The DSP 17, illustrated in FIG. 3, includes a chromatic dispersion compensator (CDC) 21, an adaptive equalizer (AEQ) 22, a frequency offset compensator (FOC) 23, and a carrier phase recovery (CPR) 24.

The CDC 21 is a wavelength-dispersion compensation circuit that compensates for wavelength dispersion that occurs in the transmission path 4. The AEQ 22 is an equalizing circuit for, for example, polarized-wave separation, band compensation, or linear distortion compensation. For example, the AEQ 22 performs a polarized-wave separation process to adaptively follow time fluctuations, such as polarized-wave fluctuations or polarized-wave mode dispersion, a compensation process to compensate for residual dispersion that has not been compensated during the previous wavelength-dispersion compensation, or a compensation process to compensate for signal band narrowing that occurs in an electric device, an optical device, or the like.

The FOC 23 is a frequency-offset compensation circuit that estimates the difference between the frequency of the LD at the side of the transmitting device 2 and the frequency of the LO light source 11 at the side of the receiving device 3 and compensates for the difference. The CPR 24 is a synchronizing circuit that compensates for phase noise of the LO light source 11 or fluctuation components of high-speed residual frequency offset that has not been compensated by the FOC 23.

Figure 4:
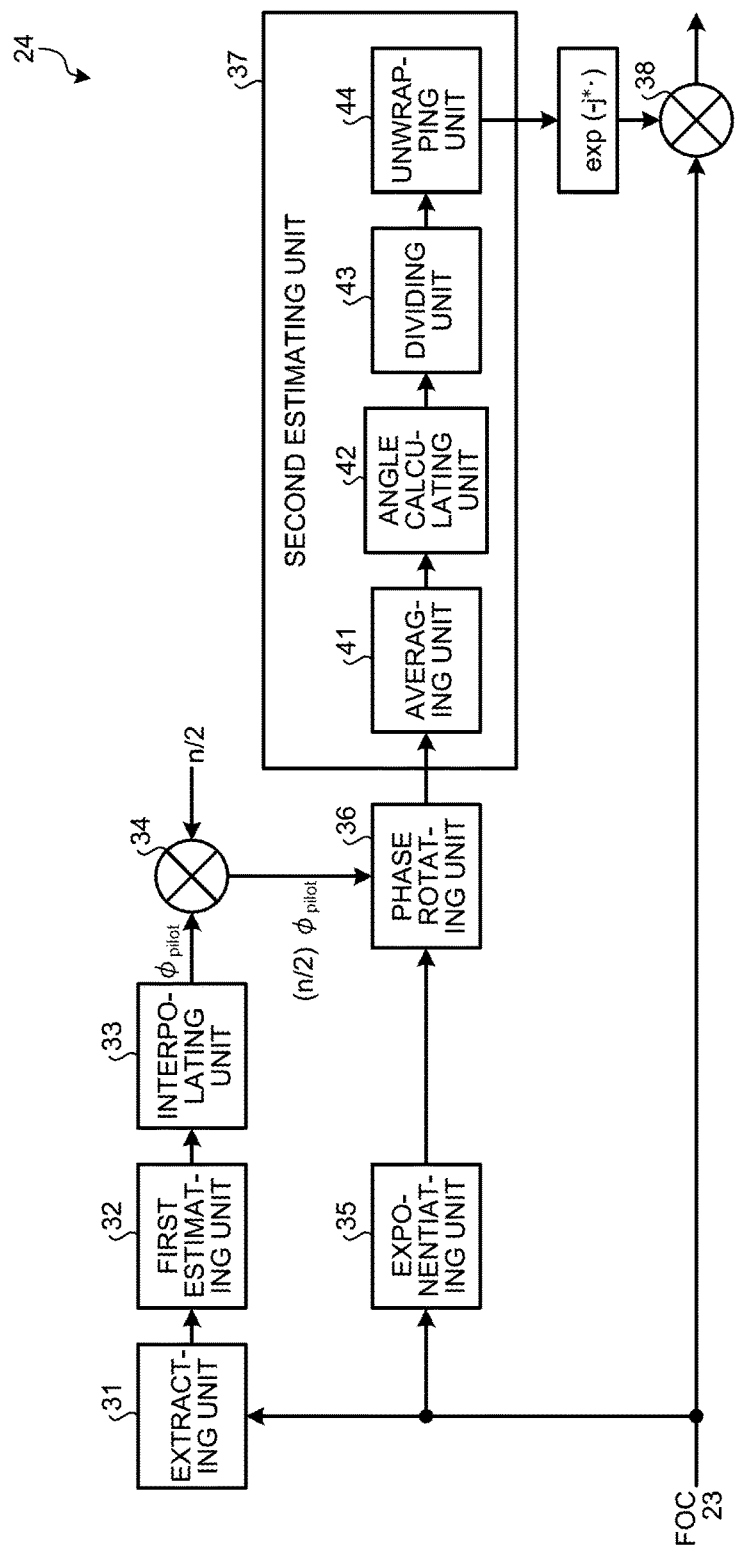
FIG. 4 is a block diagram that illustrates an example of the functional configuration inside a CPR according to the first embodiment.

FIG. 4 is a block diagram that illustrates an example of the functional configuration inside the CPR 24 according to the first embodiment. The CPR 24, illustrated in FIG. 4, is a circuit that compensates for a phase error of nPSK signals. The CPR 24 includes an extracting unit 31, a first estimating unit 32, an interpolating unit 33, a calculating unit 34, an exponentiating unit 35, a phase rotating unit 36, a second estimating unit 37, and a compensating unit 38.

The extracting unit 31 extracts a pilot symbol (PS) from output signals of the FOC 23. Here, the PS is a symbol with a predetermined pattern, which is periodically input between data symbols from the transmitting device 2. The first estimating unit 32 compares the pattern of the PS, extracted by the extracting unit 31, with the predetermined pattern of the previously stored PS to estimate the phase error ϕpilot of the PS. The first estimating unit 32 averages the phase error ϕpilot, estimated from the PS, and the previous and next phase errors ϕpilot with a time area to suppress gaussian noise. Here, the average process may be eliminated, and changes may be appropriately made.

The interpolating unit 33 conducts interpolation on the phase error ϕpilot of the PS, corresponding to the time slot of the data symbol, with a time area. The calculating unit 34 multiplies the averaged phase error ϕpilot by n/2 to calculate the reference phase (n/2)ϕpilot and outputs the reference phase to the phase rotating unit 36.

The exponentiating unit 35 raises the output signal of the FOC 23 to the power of n/2. If the nPSK signal, which is the output signal, is raised to the power of n/2, the exponentiating unit 35 consolidates the constellation points at n areas into the neighborhood of the constellation points at two areas that have a 180-degree relation on the IQ plane. Furthermore, the constellation of the received signal at the input side of the exponentiating unit 35 is represented by using the following Equation (1).

$$S_k = A * \exp\left(j\frac{2\pi}{n}(k-1) + \varphi_e\right), k \in \{1, 2, 3, \ldots, n\} \tag{1}$$

Furthermore, the constellation of the received signal at the output side of the exponentiating unit 35, i.e., after exponentiation by n/2, is represented by using the following Equation (2).

$$S_k^{n/2} = A^{n/2} * \exp\left(j\pi(k-1) + \frac{n\varphi_e}{2}\right), k \in \{1, 2, 3, \ldots, n\} \quad (2)$$

Moreover, the constellation points at two areas after exponentiation by n/2 may be represented by using Equation (3).

$$S_k^{n/2} = \begin{cases} A^{n/2} * \exp\left(j\pi + \frac{n\varphi_e}{2}\right), & k = \text{odd} \\ A^{n/2} * \exp\left(\frac{n\varphi_e}{2}\right), & k = \text{even} \end{cases} \quad (3)$$

The phase rotating unit 36 compares the reference phase (n/2)φpilot, calculated by the calculating unit 34, and the phases of the constellation points at two areas after exponentiation by n/2 to determine whether the phase difference between the reference phase (n/2)φpilot and the phase of the constellation point is equal to or more than ±90 degrees.

If the phase difference between the reference phase and the phase of the constellation point is equal to or more than ±90 degrees, the phase rotating unit 36 rotates the phase of the constellation point with a phase difference of equal to or more than ±90 degrees by 180 degrees. Specifically, out of the constellation points at two areas after exponentiation by n/2, the phase rotating unit 36 conducts phase rotation on the constellation point with a phase difference of equal to or more than ±90 degrees to consolidate it into the neighborhood of the constellation point at one area, which is the constellation point with a phase difference of less than ±90 degrees, i.e., from which phase modulated components have been removed.

The second estimating unit 37 includes an averaging unit 41, an angle calculating unit 42, a dividing unit 43, and an unwrapping unit 44. The averaging unit 41 averages constellation points of successive symbols, obtained by the phase rotating unit 36, and outputs the averaged constellation points to the angle calculating unit 42. Here, for example, the average process may reduce the effects of gaussian noise.

The angle calculating unit 42 calculates the argument φ of the constellation point by multiplication of n/2 on the basis of arctan(Q/I) of the I component and the Q component of the averaged constellation point.

Furthermore, the dividing unit 43 multiplies the n/2-fold argument nφ by 1/n to calculate a carrier-wave phase estimate value. The unwrapping unit 44 corrects the carrier-wave phase estimate value such that the difference between the carrier-wave phase estimate value with regard to the previous input symbol and the current carrier-wave phase estimate value becomes smaller. The compensating unit 38 multiplies the input symbol by the carrier-wave phase estimate value to remove phase noise, thereby compensating for a phase error of the input symbol.

Figure 5:
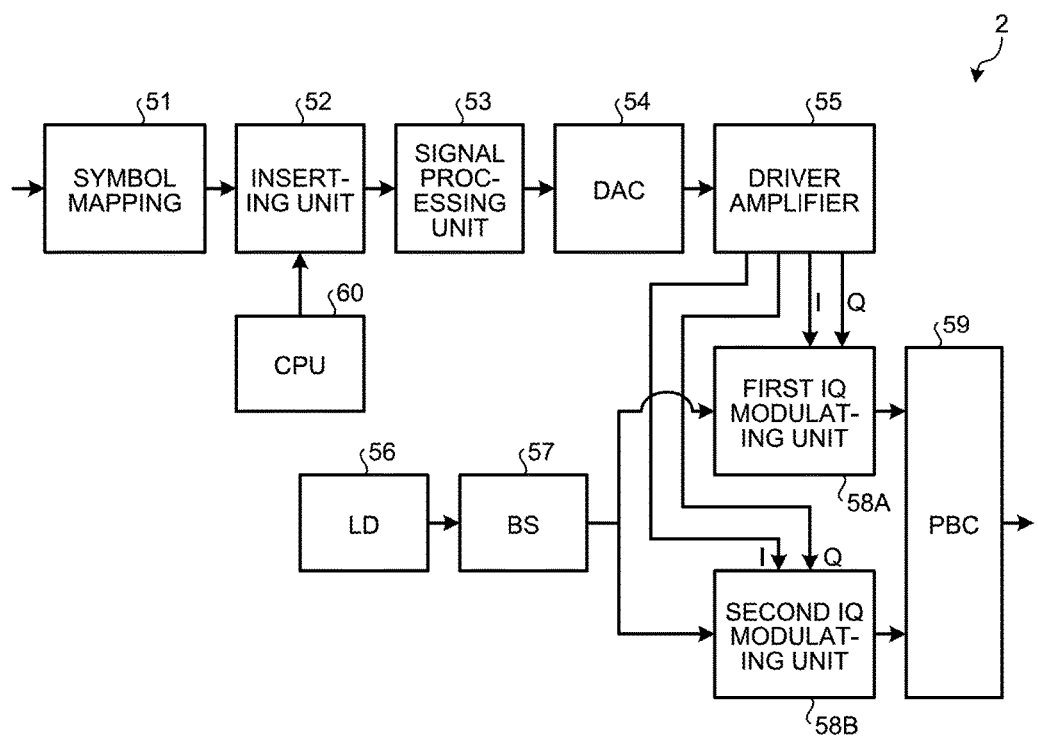
FIG. 5 is a block diagram that illustrates an example of the hardware configuration of a transmitting device.

FIG. 5 is a block diagram that illustrates an example of the hardware configuration of the transmitting device 2. The transmitting device 2, illustrated in FIG. 5, includes a symbol mapping 51, an inserting unit 52, a signal processing unit 53, a digital analog converter (DAC) 54, a driver amplifier 55, a laser diode (LD) 56, and a beam splitter (BS) 57. Furthermore, the transmitting device 2 includes a first IQ modulating unit 58A, a second IQ modulating unit 58B, a polarization beam combiner (PBC) 59, and a CPU 60.

The symbol mapping 51 is a processing unit that maps transmitted data to a symbol. The inserting unit 52 inserts a PS between data symbols at each setting cycle. Here, the PS setting cycle and the amplitude ratio may be appropriately changed for settings. For example, the receiving device 3 stores the setting patterns that correspond to the PS setting cycle and the amplitude ratio. The signal processing unit 53 performs signal processing on symbol strings. The DAC 54 converts a symbol string into analog signals and outputs them to the driver amplifier 55.

The driver amplifier 55 outputs a drive signal that corresponds to the analog signal of the symbol string to the first IQ modulating unit 58A and the second IQ modulating unit 58B. The LD 56 outputs optical signals to the BS 57. The BS 57 outputs optical signals to the first IQ modulating unit 58A and the second IQ modulating unit 58B. The first IQ modulating unit 58A generates optical modulation signals at the side of the X polarized-wave component for optical modulation on optical signals by using drive signals. The second IQ modulating unit 58B generates optical modulation signals at the side of the Y polarized-wave component for optical modulation on optical signals by using drive signals. The PBC 59 combines optical modulation signals at the side of the X polarized-wave component from the first IQ modulating unit 58A and optical modulation signals at the side of the Y polarized-wave component from the second IQ modulating unit 58B to output the optical modulation signal as a transmission symbol to the transmission path 4. The CPU 60 performs overall control of the transmitting device 2.

Figure 6A:
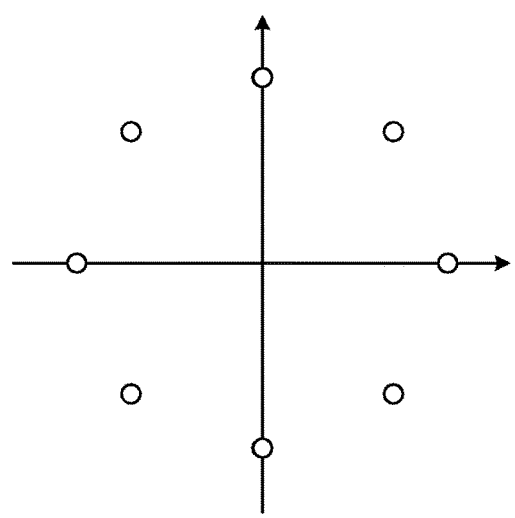
FIG. 6A is an explanatory diagram that illustrates an example of the constellation (there is no phase noise) of an 8PSK signal.

FIG. 6A is an explanatory diagram that illustrates an example of the constellation (there is no phase noise) of an 8PSK signal. Furthermore, for the convenience of explanation, the 8PSK signal is illustrated as an example of the nPSK signal. As the constellation of the 8PSK signal, illustrated in FIG. 6A, has no phase noise, the state is obtained such that the constellation points are arranged at the total of 8 areas with an interval of π/4 on the IQ plane.

Figure 6B:
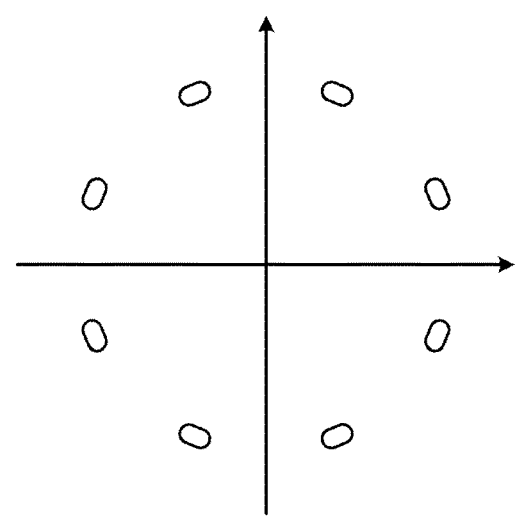
FIG. 6B is an explanatory diagram that illustrates an example of the constellation (there is phase noise) of the 8PSK signal.

FIG. 6B is an explanatory diagram that illustrates an example of the constellation (there is phase noise) of the 8PSK signal. As the constellation of the 8PSK signal, illustrated in FIG. 6B, has phase noise, there are slight errors although they are centered in the neighborhood of each of the constellation points at the total of 8 areas on the IQ plane.

Figure 6C:
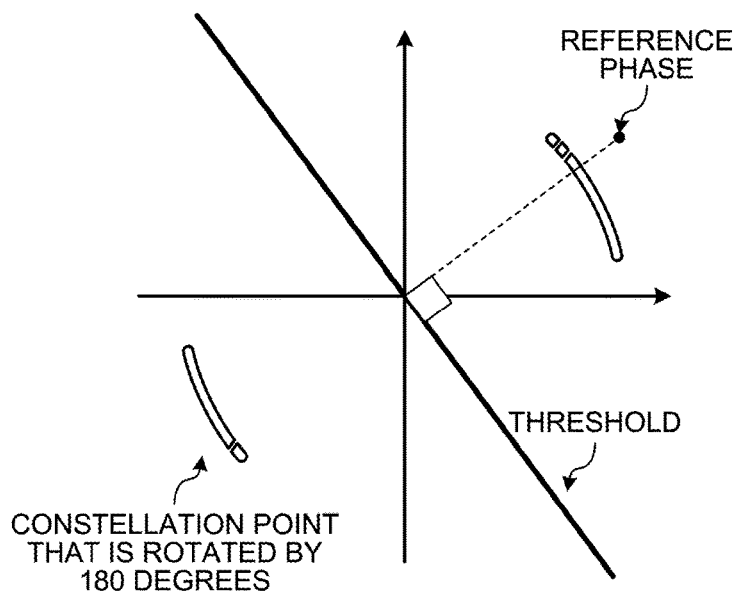
FIG. 6C is an explanatory diagram that illustrates an example of the constellation (there is phase noise) of the 8PSK signal after exponentiation by 4(=n/2)

FIG. 6C is an explanatory diagram that illustrates an example of the constellation (there is phase noise) of the 8PSK signal after exponentiation by 4(=n/2). The 8PSK signal after exponentiation by 4 is 8 PSK after exponentiation by n/2(n=8), i.e., after exponentiation by 4, on the 8PSK input symbol, calculated by the exponentiating unit 35. The reference phase is the reference phase of the PS, which is calculated by the calculating unit 34. The threshold is ±90 degrees from the reference phase. The constellation of the 8PSK signal, illustrated in FIG. 6C, corresponds to the constellation of the 8PSK after exponentiation by 4, and the state is obtained such that the constellation points at 8 areas have been consolidated into the constellation points at two areas. The phase rotating unit 36 determines whether each of the constellation points at two areas has a phase difference of equal to or more than ±90 degrees with respect to the reference phase, selects a constellation point with a phase difference of equal to or more than ±90 degrees with respect to the reference phase, and rotates the constellation point by 180 degrees. As a result, a constellation point with a phase difference of equal to or more than ±90 degrees may be consolidated into the neighborhood of the constellation point with a phase difference of less than ±90 degrees.

Next, an explanation is given of an operation of the optical transmission system 1 according to the first embodiment. FIG. 7 is a flowchart that illustrates an example of the procedure of the CPR 24 with regard to an estimation process. The estimation process, illustrated in FIG. 7, is a process to estimate a phase error of the PS on the basis of the PS included in the received signal, estimate the reference phase of the PS on the basis of the estimated phase error, and set the reference phase in the phase rotating unit 36.

In FIG. 7, the extracting unit 31 in the CPR 24 determines whether a PS has been extracted from the received signal (Step S11). If a PS has been extracted (Yes at Step S11), the first estimating unit 32 in the CPR 24 compares the extracted PS with the predetermined pattern of the PS (Step S12). Here, the predetermined pattern is previously stored as the PS setting pattern.

In accordance with a comparison result between the PS and the predetermined pattern, the first estimating unit 32 estimates a phase error of the PS (Step S13). The first estimating unit 32 averages the phase error of the PS with a time area (Step S14). The interpolating unit 33 of the CPR 24 conducts interpolation on the averaged phase error of the PS with a time area (Step S15). The calculating unit 34 of the CPR 24 multiplies the interpolated phase error of the PS by n/2 to calculate the reference phase (Step S16). Furthermore, the calculating unit 34 outputs the calculated reference phase to the phase rotating unit 36 (Step S17) and terminates the procedure that is illustrated in FIG. 7. If a PS has not been extracted from the received signal (No at Step S11), the first estimating unit 32 terminates the procedure that is illustrated in FIG. 7.

FIG. 8 is a flowchart that illustrates an example of the procedure of the CPR 24 with regard to a phase compensation process. The phase compensation process, illustrated in FIG. 8, is a process to consolidate the constellation points at two areas after exponentiation by n/2 into the neighborhood of the constellation point at one area on the basis of the reference phase, calculate a carrier-wave phase estimate value on the basis of the consolidated constellation point, and compensate for a phase error of the received signal in accordance with the carrier-wave phase estimate value. In FIG. 8, the exponentiating unit 35 in the CPR 24 raises the received signal to the power of n/2, thereby calculating the constellation points after exponentiation by n/2 (Step S21). Here, the constellation points after exponentiation by n/2 are divided into constellation points at two areas, i.e., two groups. The phase rotating unit 36 in the CPR 24 compares the phases of the constellation points at two areas after exponentiation by n/2 with the reference phase (Step S22).

The phase rotating unit 36 determines whether a comparison result, i.e., a phase difference, between the phase of the constellation point after exponentiation by n/2 and the reference phase is equal to or more than ±90 degrees (Step S23). If the phase difference is equal to or more than ±90 degrees (Yes at Step S23), the phase rotating unit 36 rotates by 180 degrees the constellation point after exponentiation by n/2 with a phase difference of equal to or more than ±90 degrees with respect to the reference phase (Step S24). That is, out of the constellation points at two areas after exponentiation by n/2, the phase rotating unit 36 consolidates the constellation point with a phase difference of equal to or more than ±90 degrees into the neighborhood of the constellation point at one area, which is in the neighborhood of the reference phase and which has a phase difference of less than ±90 degrees.

The averaging unit 41 in the CPR 24 averages the output of the phase rotating unit 36, i.e., the neighborhood of the consolidated constellation point at one area (Step S25). The angle calculating unit 42 in the CPR 24 calculates the argument of the constellation point by multiplication of n/2 on the basis of arctan(Q/I) of the averaged constellation point (Step S26). The dividing unit 43 in the CPR 24 multiplies the n/2-fold argument by 1/n to calculate a carrier-wave phase estimate value (Step S27).

The unwrapping unit 44 in the CPR 24 corrects the carrier-wave phase estimate value through an unwrapping process (Step S28). The compensating unit 38 in the CPR 24 multiplies the received signal by the corrected carrier-wave phase estimate value to compensate for a phase error of the received signal (Step S29) and terminates the procedure that is illustrated in FIG. 8.

If a phase difference is not equal to or more than ±90 degrees (No at Step S23), the phase rotating unit 36 determines that there is no phase rotation (Step S30) and proceeds to Step S25 to average the constellation point after exponentiation by n/2.

Figure 9:
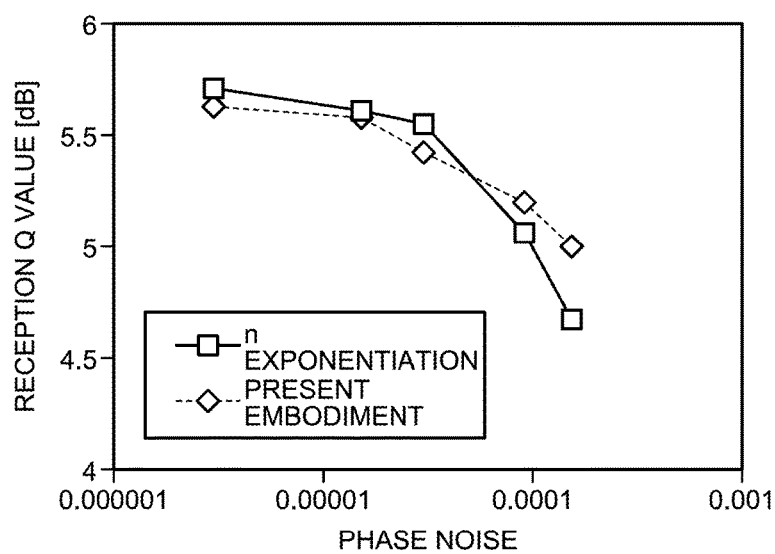
FIG. 9 is an explanatory diagram that illustrates an example of the simulation result comparison between the present embodiment and the Viterbi-Viterbi algorithm (exponentiation by n)

FIG. 9 is an explanatory diagram that illustrates an example of the simulation result comparison between the present embodiment and the Viterbi-Viterbi algorithm (exponentiation by n). Here, the vertical axis in the explanatory diagram of FIG. 9 denotes the reception Q value in terms of the bit error rate (BER), and the horizontal axis denotes phase noise that is calculated by the product of the laser linewidth and the symbol cycle. The simulation condition is such that Dual Polarization (DP)-8PSK is used as a modulation method, a PS is inserted in a 32-symbol interval, the symbol rate is 32 Gbaud, and the OSNR is 15 dB. According to the simulation result of the Viterbi-Viterbi algorithm, as phase noise increases, the reception Q value decreases; however, according to the simulation result of the present embodiment, even if phase noise increases, the reception Q value is improved as compared to the Viterbi-Viterbi algorithm. Thus, according to the present embodiment, improvements in the phase-noise resistance are confirmed.

The CPR 24 according to the first embodiment extracts a PS from the received signal, estimates a phase error of the extracted PS, and calculates the reference phase from the phase error of the PS. Furthermore, through exponentiation by n/2 on the received signal, the CPR 24 consolidates the constellation points at n areas into the phases of the constellation points at two areas that have a 180-degree relation. Furthermore, the CPR 24 compares the phases of the constellation points at two areas with the reference phase and conducts 180-degree phase rotation on the constellation point with a phase difference of equal to or more than ±90 degrees so that the constellation point with a phase difference of equal to or more than ±90 degrees is consolidated into the neighborhood of the constellation point at one area with a phase difference of less than ±90 degrees. The CPR 24 estimates a carrier-wave phase estimate value on the basis of the neighborhood of the consolidated constellation point at one area and, based on the estimated carrier-wave phase estimate value, compensates for a phase error of the received signal. As a result, a phase error of a received signal in the nPSK system may be compensated.

The exponentiating unit 35 in the CPR 24 conducts exponentiation by n/2 on a received signal, thereby consolidating constellation points at n areas into constellation points at two areas. As a result, it is possible to prevent the occurrence of phase slip.

The phase rotating unit 36 in the CPR 24 conducts phase rotation such that the constellation point, which is included in the constellation points at two areas, consolidated by the exponentiating unit 35, is consolidated into the neighborhood of the constellation point at one area in the vicinity of the reference phase. As a result, constellation points at n areas may be consolidated into the neighborhood of the constellation point at one area.

Figure 10:
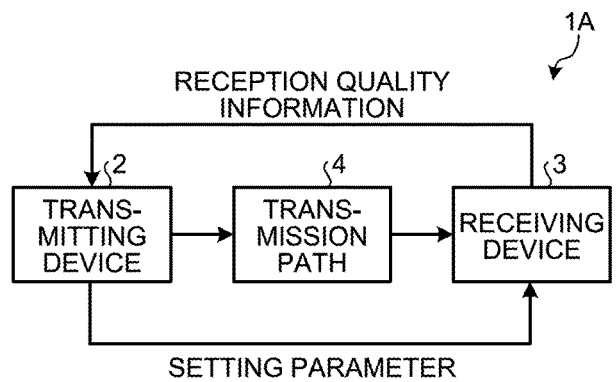
FIG. 10 is an explanatory diagram that illustrates an example of an optical transmission system according to a second embodiment.

Furthermore, according to the above-described first embodiment, a PS is extracted from a received signal at each setting cycle, and the reference phase is acquired from the extracted PS. However, based on the reception quality information on a received signal, the receiving device 3 may give a command to the transmitting device 2 to change the PS parameter setting. An embodiment in this case is explained below as a second embodiment. FIG. 10 is an explanatory diagram that illustrates an example of an optical transmission system 1A according to the second embodiment. Furthermore, the same components as those of the optical transmission system 1 according to the first embodiment are attached with the same reference numerals, and duplicated explanations for their configurations and operations are omitted.

[b] Second Embodiment

The receiving device 3 of the optical transmission system 1A, illustrated in FIG. 10, acquires the reception quality information from a received signal and notifies the acquired reception quality information to the transmitting device 2. The transmitting device 2 changes the PS setting parameter on the basis of the reception quality information. The reception quality information is signal quality information, such as the BER or the phase slip rate.

On the basis of the reception quality information, the CPU 60 in the transmitting device 2 sets the amplitude ratio between the data symbol and the PS. Based on the reception quality information, the CPU 60 sets the PS insertion cycle in the inserting unit 52. On the basis of the amplitude ratio and the insertion cycle, the CPU 60 changes the PS setting parameter. Furthermore, with the CPU 60, as the amplitude ratio of the data symbol is larger than the amplitude ratio of the PS, the Signal/Noise (SN) ratio of the data symbol is further improved and therefore resistance to gaussian noise is increased; however, as the SN ratio of the PS is decreased, the accuracy of the reference phase, obtained from the PS, is reduced. Furthermore, the optimum amplitude ratio is different depending on a transmission condition of the transmission path 4. Moreover, with the CPU 60, as the PS insertion cycle is shorter, phase-noise following performance becomes higher but the transmission rate of data symbols is decreased. Therefore, in consideration of the above aspects, the transmitting device 2 optimizes the setting parameters, such as the PS insertion cycle or the amplitude ratio, on the basis of the reception quality information at the side of the receiving device 3.

The CPU 60 notifies the PS setting parameter to the receiving device 3. In accordance with the PS setting parameter, the receiving device 3 changes the settings of the predetermined pattern of the PS, stored in the first estimating unit 32.

Figure 11:
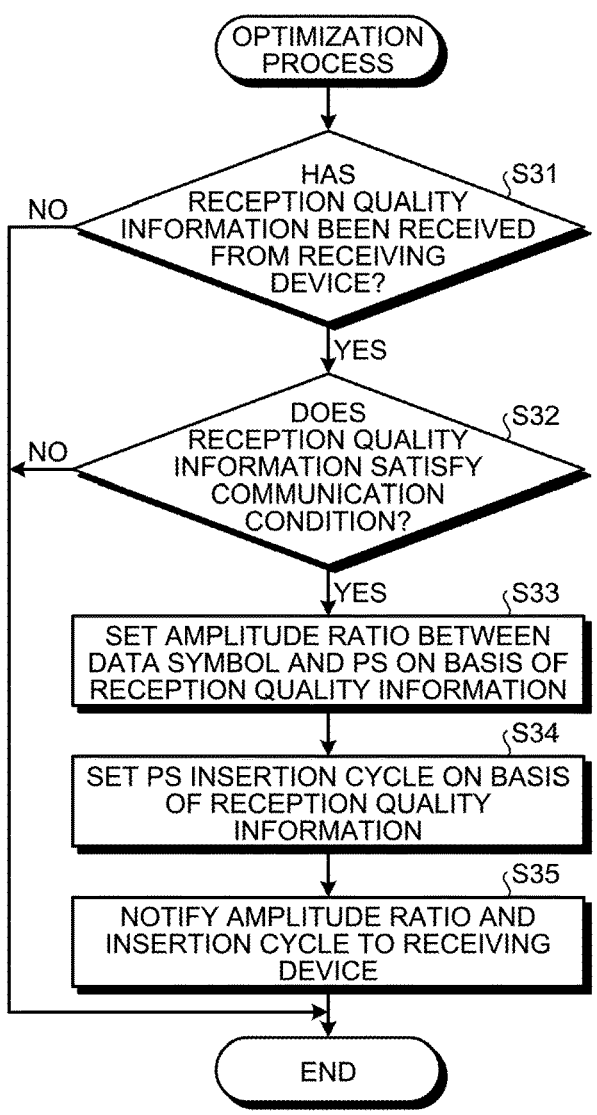
FIG. 11 is a flowchart that illustrates an example of the procedure of a CPU of the transmitting device with regard to an optimization process.

Next, an explanation is given of an operation of the optical transmission system 1A according to the second embodiment. FIG. 11 is a flowchart that illustrates an example of the procedure of the CPU 60 of the transmitting device 2 with regard to an c. The optimization process, illustrated in FIG. 11, is a process to optimize the PS setting parameter on the basis of the reception quality information and notifies the setting parameter to the receiving device 3.

The CPU 60 at the side of the transmitting device 2, illustrated in FIG. 11, determines whether the reception quality information has been received from the receiving device 3 (Step S31). If the reception quality information has been received (Yes at Step S31), the CPU 60 determines whether the reception quality information satisfies the normal communication condition (Step S32).

If the reception quality information satisfies the normal communication condition (Yes at Step S32), the CPU 60 sets the amplitude ratio between the data symbol and the PS in the inserting unit 52 on the basis of the reception quality information (Step S33). The CPU 60 sets the PS insertion cycle in the inserting unit 52 on the basis of the reception quality information (Step S34).

The CPU 60 notifies the amplitude ratio and the insertion cycle to the receiving device 3 (Step S35) and terminates the procedure that is illustrated in FIG. 11. If the reception quality information has not been received (No at Step S31) or if the reception quality information does not satisfy the normal communication condition (No at Step S32), the CPU 60 terminates the procedure that is illustrated in FIG. 11.

The transmitting device 2 according to the second embodiment sets the setting parameter, such as the PS insertion cycle or the amplitude ratio, on the basis of the reception quality information from the receiving device 3 and notifies the setting parameter to the receiving device 3. As a result, the receiving device 3 may extract the optimum PS.

Here, in the above-described first embodiment, phase rotation is conducted by the phase rotating unit 36 on the phases of the constellation points at two areas, calculated through exponentiation by n/2, on the basis of the reference phase of the PS, the carrier-wave phase estimate value is estimated on the basis of the constellation point after phase rotation, and a phase error of the received signal is compensated on the basis of the carrier-wave phase estimate value. However, this configuration is not a limitation; changes may be optionally made, and an embodiment is explained below as a third embodiment.

[c] Third Embodiment

Figure 12:
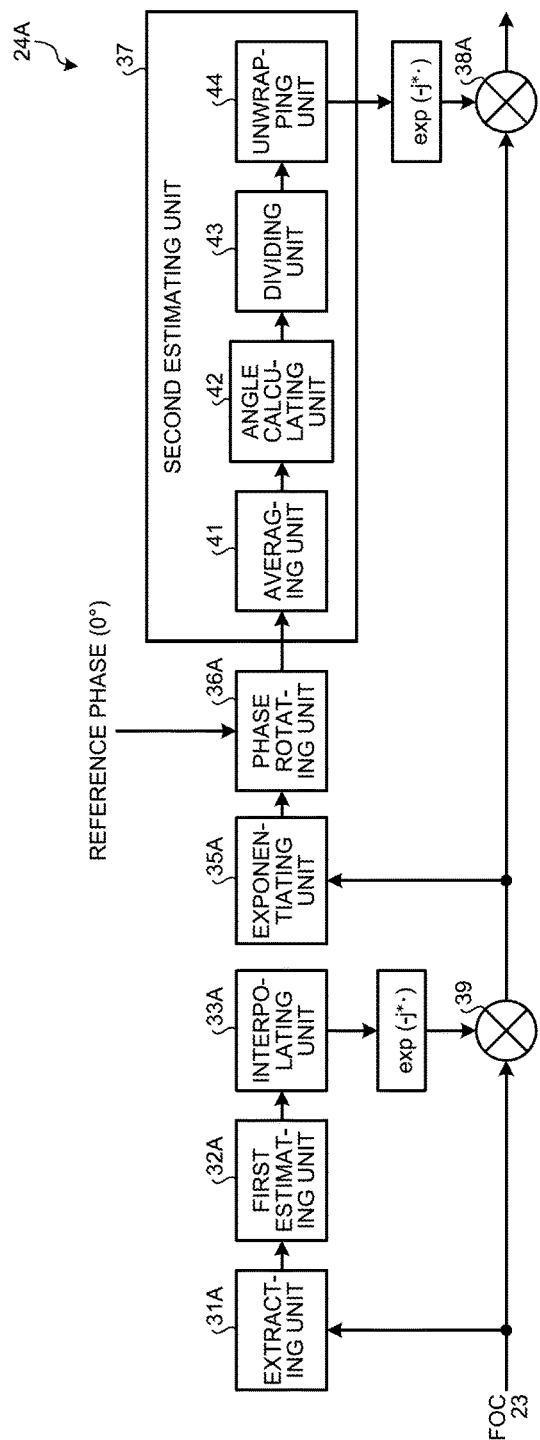
FIG. 12 is a block diagram that illustrates an example of the functional configuration of a CPR according to a third embodiment.

FIG. 12 is a block diagram that illustrates an example of the functional configuration of a CPR 24A according to the third embodiment. Furthermore, the same components as those of the optical transmission system 1 according to the first embodiment are attached with the same reference numerals, and duplicated explanations for their configurations and operations are omitted.

The CPR 24A, illustrated in FIG. 12, includes an extracting unit 31A, a first estimating unit 32A, an interpolating unit 33A, a first compensating unit 39, an exponentiating unit 35A, a phase rotating unit 36A, the second estimating unit 37, and a second compensating unit 38A. The CPR 24A performs, by stages, a first compensation process to compensate for phase errors of a received signal by using a phase error of a PS and a second compensation process to compensate for phase errors of a received signal by using a carrier-wave phase estimate value that is obtained through exponentiation by n/2 on the received signal after the first compensation process. During the first compensation process, a phase error of a received signal is compensated on the basis of a phase error of the PS. During the second compensation process, a carrier-wave phase estimate value is estimated on the basis of the constellation point obtained through exponentiation by n/2 on the received signal after the first compensation process, and a phase error of the received signal after the first compensation process is compensated on the basis of the carrier-wave phase estimate value. The extracting unit 31A extracts the PS from the received signal of the FOC 23. The first estimating unit 32A compares the PS, extracted by the extracting unit 31A, with the predetermined pattern of the PS and estimates a phase error of the PS, which is a comparison result. The interpolating unit 33A conducts interpolation on the phase error, estimated by the first estimating unit 32A, corresponding to the time slot of the data symbol, with a time area. The first compensating unit 39 multiples the received signal of the FOC 23 by the phase error after the interpolation process by the interpolating unit 33A, thereby roughly compensating for a phase error of the received signal. The first compensating unit 39 outputs the compensated received signal to the second compensating unit 38A.

The exponentiating unit 35A raises the received signal, compensated by the first compensating unit 39, to the power of n/2 and consolidates the constellation points at n areas on the IQ plane into the neighborhood of the constellation points at two areas that have a 180-degree relation. The phase rotating unit 36A sets 0 degree as the reference phase and, in order to consolidate the constellation points at two areas, obtained through exponentiation by n/2, into the neighborhood of the constellation point at one area, conducts 180-degree phase rotation on one constellation point out of the constellation points at two areas to the other constellation point. Then, the phase rotating unit 36A outputs the constellation point at one area after phase rotation to the second estimating unit 37. Here, the reason why the reference phase is 0 degree for the phase rotating unit 36A is that a phase error of a received signal has been already compensated by using a phase error of the PS by the first compensating unit 39.

The averaging unit 41 averages the constellation point at one area after the phase rotating unit 36A conducts phase rotation. The angle calculating unit 42 calculates the argument φ of the constellation point at one area by multiplication of n/2 on the basis of arctan(Q/I) of the I component and the Q component of the averaged constellation point at one area. Furthermore, the dividing unit 43 multiplies the n/2-fold argument nφ by 1/n to calculate a carrier-wave phase estimate value. The unwrapping unit 44 corrects the carrier-wave phase estimate value such that the difference between the carrier-wave phase estimate value with regard to the previous input symbol and the current carrier-wave phase estimate value becomes smaller. The second compensating unit 38A multiplies the received signal after the first compensation process by the first compensating unit 39 by the carrier-wave phase estimate value to compensate for a phase error of the received signal and outputs the compensated received signal.

The CPR 24A according to the third embodiment uses the first compensating unit 39 to compensate for a phase error of the received signal by using a phase error of the PS and then raise the compensated received signal to the power of n/2 to consolidate the constellation points at n areas into the constellation points at two areas. Furthermore, the CPR 24A uses the phase rotating unit 36A to conduct 180-degree phase rotation on one constellation point out of the constellation points at two areas to consolidate it into the neighborhood of the constellation point at one area and output the constellation point after phase rotation to the second estimating unit 37. The second estimating unit 37 estimates a carrier-wave phase estimate value on the basis of the constellation point at one area after phase rotation and outputs the carrier-wave phase estimate value to the second compensating unit 38A. The second compensating unit 38A multiplies the received signal, compensated by the first compensating unit 39, by the carrier-wave phase estimate value to compensate for a phase error of the received signal, compensated by the first compensating unit 39. As a result, a phase error of a received signal may be compensated in stages.

The CPR 24A according to the third embodiment compensates for a phase error of a received signal by using a phase error of the PS during the first compensation process and then calculates a carrier-wave phase estimate value by using the constellation point that is obtained through exponentiation by n/2 on the received signal after the first compensation process. Furthermore, based on the carrier-wave phase estimate value, the CPR 24A compensates for a phase error of the received signal after the first compensation process. As a result, a phase error of a received signal may be compensated in stages.

Figure 13:
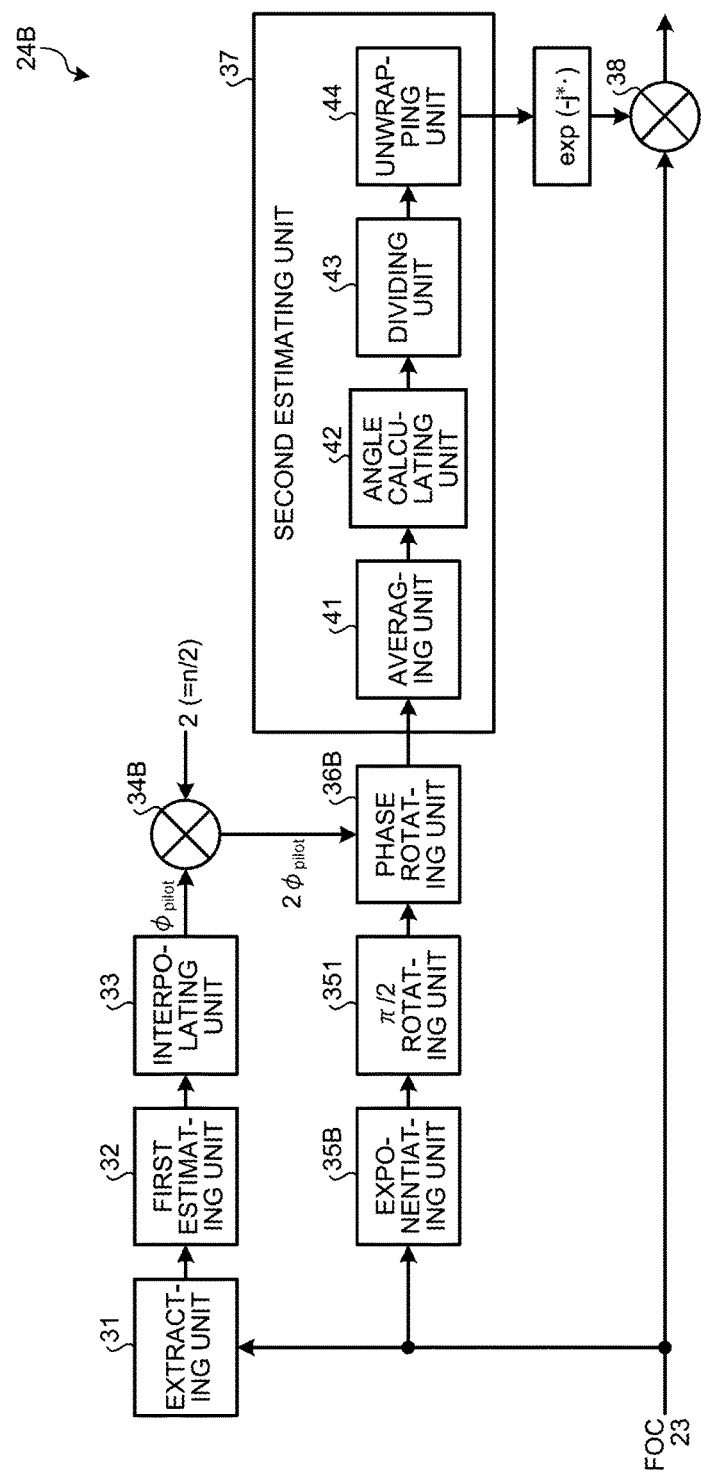
FIG. 13 is an block diagram that illustrates an example of the functional configuration of a CPR with regard to the receiving device in the QPSK system according to a fourth embodiment.

Although the optical transmission system 1 with the nPSK system is described as an example of the optical transmission system 1 according to the above-described first embodiment, an embodiment in a case where the QPSK system is used is explained below as a fourth embodiment. FIG. 13 is an explanatory diagram that illustrates an example of the functional configuration of the CPR 24B with regard to the receiving device 3 in the QPSK system according to the fourth embodiment. Here, the same components as those of the optical transmission system 1 according to the first embodiment are attached with the same reference numerals, and duplicated explanations for their configurations and operations are omitted.

[d] Fourth Embodiment

As the CPR 24B, illustrated in FIG. 13, uses the QPSK system, it includes the extracting unit 31, the first estimating unit 32, the interpolating unit 33, a calculating unit 34B, an exponentiating unit 35B, a π/2 rotating unit 351, a phase rotating unit 36B, the second estimating unit 37, and the compensating unit 38.

The extracting unit 31 extracts a PS from a received signal in the QPSK system. The first estimating unit 32 compares the extracted PS with the predetermined pattern of the PS and estimates a phase error of the PS from a comparison result. Furthermore, the first estimating unit 32 may perform an average process by using phase errors before and after the estimated phase error to reduce gaussian noise, and changes may be optionally made. The first estimating unit 32 outputs a phase error of the PS to the interpolating unit 33. The interpolating unit 33 conducts interpolation on the phase error of the PS, corresponding to the time slot of the data symbol, with a time area and outputs the phase error of the PS after the interpolation process to the calculating unit 34B. The calculating unit 34B multiplies the phase error φpilot of the PS by 2(=n/2) and outputs the reference phase 2φpilot to the phase rotating unit 36B.

As it is the QPSK system, i.e., n=4, the exponentiating unit 35B raises the received signal to the power of n/2. Specifically, the exponentiating unit 35B raises the received signal to the power of 2, thereby consolidating the constellation points at 4 areas on the IQ plane into the neighborhood of the constellation points at two areas, which have a 180-degree relation. Furthermore, the constellation of the QPSK signal at the input side of the exponentiating unit 35B may be represented by using Equation (4).

$$S_k = A * \exp\left(j\frac{\pi}{2}(k-1) + \frac{\pi}{4} + \varphi_e\right), k \in \{1, 2, 3, 4\} \quad (4)$$

Moreover, the constellation of the QPSK signal after exponentiation by 2 at the output side of the exponentiating unit 35B may be represented by using Equation (5).

$$S_k^4 = A^{4*}\exp(2\pi(k-1)+\gamma c+4\phi_e) \quad (5)$$

The π/2 rotating unit 351 rotates the constellation points at two areas after exponentiation by 2 by 90 degrees and outputs the constellation points at two areas after phase rotation to the phase rotating unit 36B. The phase rotating unit 36B compares the phases of the constellation points at two areas after phase rotation with the reference phase 2φpilot and if a phase difference is equal to or more than ±90 degrees, rotates the constellation point with equal to or more than ±90 degrees by 180 degrees to consolidate it into the neighborhood of the constellation point at one area.

Figure 14:
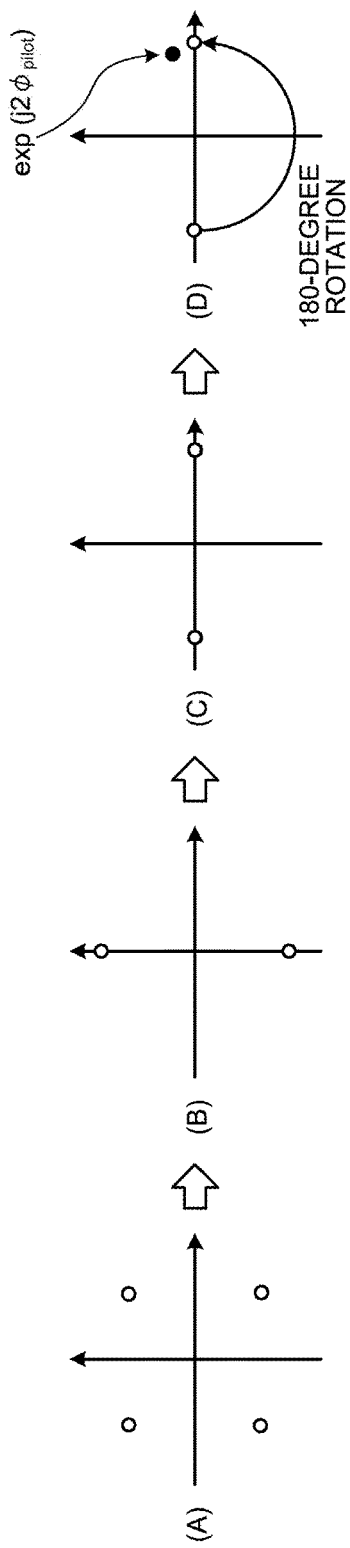
FIG. 14 is an explanatory diagram that illustrates an example of the transition of the constellation before and after exponentiation by n/2 on the QPSK signal and before and after phase rotation.

FIG. 14 is an explanatory diagram that illustrates an example of the transition of the constellation before and after exponentiation by n/2 on the QPSK signal and before and after phase rotation. The constellation of the QPSK signal in FIG. 14(A) is in a state before the exponentiating unit 35B conducts exponentiation by 2, i.e., a state where there are constellation points at four areas. The constellation of the QPSK signal in FIG. 14(B) is in a state after the exponentiating unit 35B conducts exponentiation by 2, i.e., a state where the constellation points at four areas before exponentiation by 2 have been consolidated into the constellation points at two areas after exponentiation by 2. The constellation of the QPSK signal in FIG. 14(C) is in a state where there are the constellation points at two areas after the π/2 rotating unit 351 performs rotation by 90 degrees. The constellation of the QPSK signal in FIG. 14(D) is in a state where a constellation point with a phase difference of equal to or more than ±90 degrees with respect to the reference phase has been rotated by 180 degrees by the phase rotating unit 36B so that it has been consolidated into the neighborhood of the constellation point at one area.

The averaging unit 41 of the second estimating unit 37 averages a constellation point at one area after the phase rotating unit 36B conducts phase rotation. Based on arctan (Q/I) of the I component and the Q component of the averaged constellation point at one area, the angle calculating unit 42 of the second estimating unit 37 calculates the argument φ of the constellation point by multiplication of 2(=n/2). The dividing unit 43 of the second estimating unit 37 multiplies the 2(=n/2)-fold argument 2φ by ½ (=1/(n/2)) to calculate a carrier-wave phase estimate value. The unwrapping unit 44 in the second estimating unit 37 corrects the carrier-wave phase estimate value such that the difference between the carrier-wave phase estimate value with regard to the previous input symbol and the current carrier-wave phase estimate value becomes smaller. The compensating unit 38 multiplies the received signal by the carrier-wave phase estimate value to compensate for a phase error of the received signal.

The CPR 24B according to the fourth embodiment extracts a PS from the received signal, estimates a phase error of the extracted PS, and calculates the reference phase from the phase error of the PS. Furthermore, through exponentiation by 2 on the received signal in the QPSK system, the CPR 24B consolidates the constellation points at 4 areas into the constellation points at two areas that have a 180-degree relation. Furthermore, the CPR 24B compares the phases of the constellation points at two areas with the reference phase and conducts 180-degree phase rotation on the constellation point with a phase difference of equal to or more than ±90 degrees so that the constellation point with a phase difference of equal to or more than ±90 degrees is consolidated into the other constellation point. The CPR 24B estimates a carrier-wave phase estimate value on the basis of the consolidated constellation point and, based on the estimated carrier-wave phase estimate value, compensates for a phase error of the received signal. As a result, phase errors of a received signal in the QPSK system may be compensated.

The exponentiating unit 35B in the CPR 24B conducts exponentiation by 2 on a received signal in the QPSK system, thereby consolidating constellation points at four areas into constellation points at two areas. As a result, it is possible to prevent the occurrence of phase slip.

The phase rotating unit 36B in the CPR 24B conducts phase rotation such that the constellation point, which is included in the constellation points at two areas, consolidated by the exponentiating unit 35B, is consolidated into the constellation point at one area in the neighborhood of the reference phase. As a result, constellation points at two areas may be consolidated into the neighborhood of the constellation point at one area.

Figure 15:
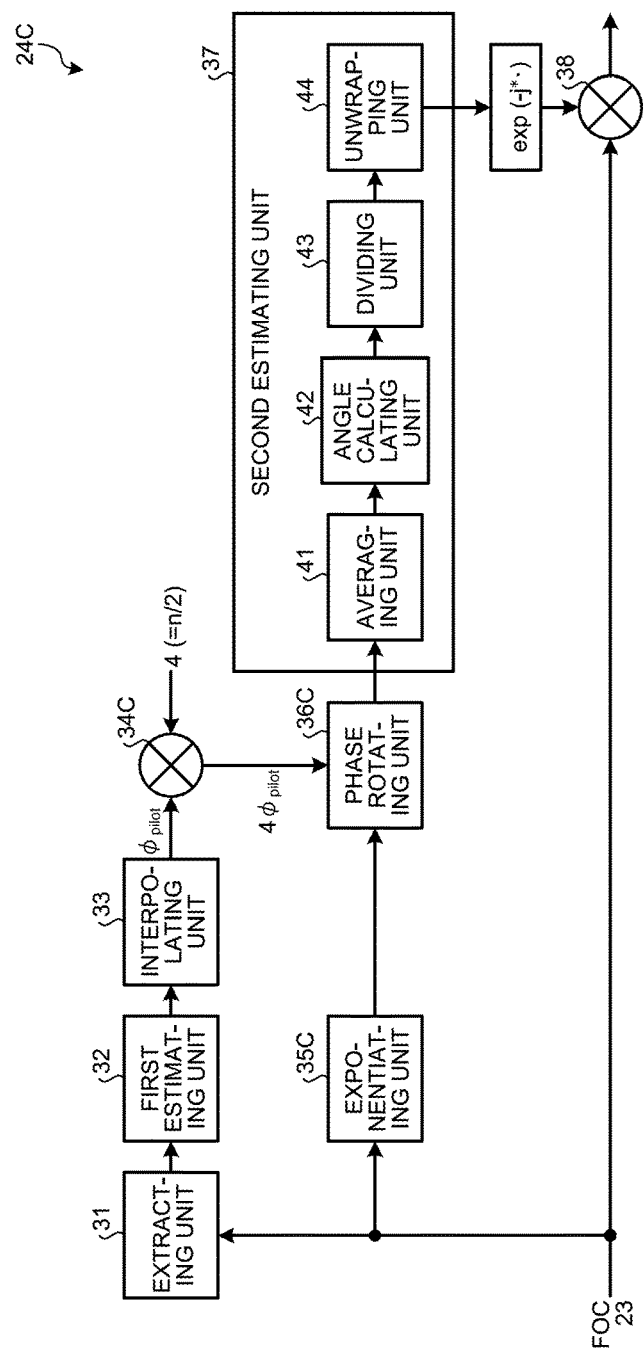
FIG. 15 is a block diagram that illustrates an example of the functional configuration of a CPR with regard to the receiving device in the 8PSK system according to a fifth embodiment.

Although the optical transmission system 1 with the nPSK system is described as an example of the optical transmission system 1 according to the above-described first embodiment, an embodiment in a case where the 8PSK system is used is explained below as a fifth embodiment. FIG. 15 is a block diagram that illustrates an example of the functional configuration of a CPR 24C with regard to the receiving device 3 in the 8PSK system according to the fifth embodiment. Here, the same components as those of the optical transmission system 1 according to the first embodiment are attached with the same reference numerals, and duplicated explanations for their configurations and operations are omitted.

[e] Fifth Embodiment

As the CPR 24C, illustrated in FIG. 15, uses the 8PSK system, it includes the extracting unit 31, the first estimating unit 32, the interpolating unit 33, a calculating unit 34C, an exponentiating unit 35C, a phase rotating unit 36C, the second estimating unit 37, and the compensating unit 38.

The extracting unit 31 extracts a PS from a received signal in the QPSK system. The first estimating unit 32 compares the extracted PS with the predetermined pattern of the PS and estimates a phase error of the PS from a comparison result. Furthermore, the first estimating unit 32 may perform an average process by using phase errors before and after the estimated phase error to reduce gaussian noise, and changes may be optionally made. The first estimating unit 32 outputs a phase error of the PS to the interpolating unit 33. The interpolating unit 33 conducts interpolation on the phase error of the PS, corresponding to the time slot of the data symbol, with a time area and outputs the phase error of the PS after the interpolation process to the calculating unit 34C. The calculating unit 34C multiplies the phase error φpilot of the PS by 4(=n/2) and outputs the reference phase 4φpilot to the phase rotating unit 36C.

As it is the 8PSK system, i.e., n=8, the exponentiating unit 35C raises the received signal to the power of n/2. Specifically, the exponentiating unit 35C raises the received signal to the power of 4, thereby consolidating the constellation points at 8 areas on the IQ plane into the neighborhood of the constellation points at 2 areas, which have a 180-degree relation. The exponentiating unit 35C outputs the constellation points at two areas after exponentiation by 4 to the phase rotating unit 36C. The phase rotating unit 36C compares the phases of the constellation points at two areas after phase rotation with the reference phase 4ϕpilot and, if a phase difference is equal to or more than ±90 degrees, rotates the constellation point with equal to or more than ±90 degrees by 180 degrees to consolidate it into the neighborhood of the constellation point at one area.

Figure 16:
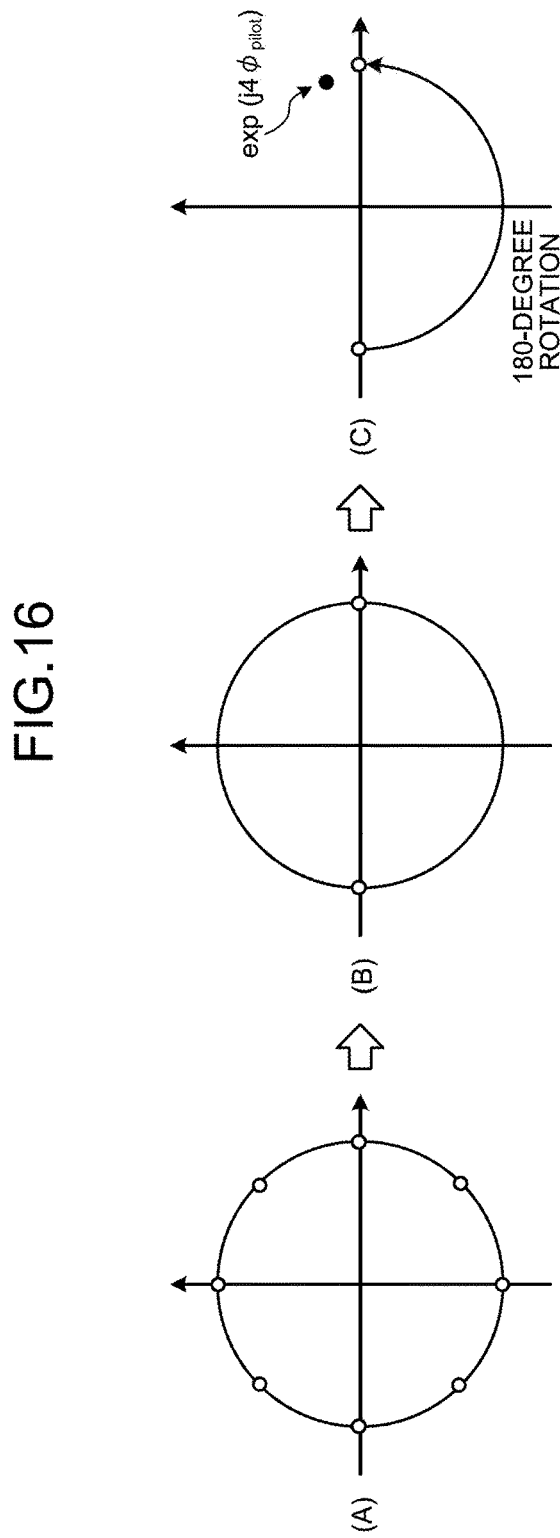
FIG. 16 is an explanatory diagram that illustrates an example of the transition of the constellation before and after exponentiation by n/2 on the 8PSK signal and before and after phase rotation.

FIG. 16 is an explanatory diagram that illustrates an example of the transition of the constellation before and after exponentiation by n/2 on the 8PSK signal and before and after phase rotation. The constellation of the 8PSK signal in FIG. 16(A) is in a state before the exponentiating unit 35C conducts exponentiation by 4, i.e., a state where there are constellation points at 8 areas. The constellation of the 8PSK signal in FIG. 16(B) is in a state after the exponentiating unit 35C conducts exponentiation by 4, i.e., a state where the constellation points at 8 areas before exponentiation by 4 have been consolidated into the constellation points at 2 areas after exponentiation by 4. The constellation of the 8PSK signal in FIG. 16(C) is in a state where a constellation point with a phase difference of equal to or more than ±90 degrees with respect to the reference phase has been rotated by 180 degrees by the phase rotating unit 36C so that it has been consolidated into the neighborhood of the constellation point at one area.

The averaging unit 41 in the second estimating unit 37 averages a constellation point at one area after the phase rotating unit 36C conducts phase rotation. Based on arctan (Q/I) of the I component and the Q component of the averaged constellation point at one area, the angle calculating unit 42 in the second estimating unit 37 calculates the argument ϕ of the constellation point by multiplication of 4(=n/2). The dividing unit 43 of the second estimating unit 37 multiplies the 4(=n/2)-fold argument 4ϕ by ¼ (=1/(n/2)) to calculate a carrier-wave phase estimate value. The unwrapping unit 44 of the second estimating unit 37 corrects the carrier-wave phase estimate value such that the difference between the carrier-wave phase estimate value with regard to the previous input symbol and the current carrier-wave phase estimate value becomes smaller. The compensating unit 38 multiplies the received signal by the carrier-wave phase estimate value to compensate for a phase error of the received signal.

The CPR 24C according to the fifth embodiment extracts a PS from the received signal, estimates a phase error of the extracted PS, and calculates the reference phase from the phase error of the PS. Furthermore, through exponentiation by 4 on the received signal in the 8PSK system, the CPR 24C consolidates the constellation points at 8 areas into the constellation points at 2 areas that have a 180-degree relation. Furthermore, the CPR 24C compares the phases of the constellation points at two areas with the reference phase and conducts 180-degree phase rotation on the constellation point with a phase difference of equal to or more than ±90 degrees so that the constellation point with a phase difference of equal to or more than ±90 degrees is consolidated into the other constellation point. The CPR 24C estimates a carrier-wave phase estimate value on the basis of the consolidated constellation point and, based on the estimated carrier-wave phase estimate value, compensates for a phase error of the received signal. As a result, phase errors of a received signal in the 8PSK system may be compensated.

The exponentiating unit 35C of the CPR 24C conducts exponentiation by 4 on received signals in the 8PSK system, thereby consolidating constellation points at eight areas into constellation points at two areas. As a result, it is possible to prevent the occurrence of phase slip.

The phase rotating unit 36C in the CPR 24C conducts phase rotation such that the constellation point, which is included in the constellation points at two areas, consolidated by the exponentiating unit 35B, is consolidated into the constellation point at one area in the neighborhood of the reference phase. As a result, constellation points at two areas may be consolidated into the neighborhood of the constellation point at one area.

Figure 17:
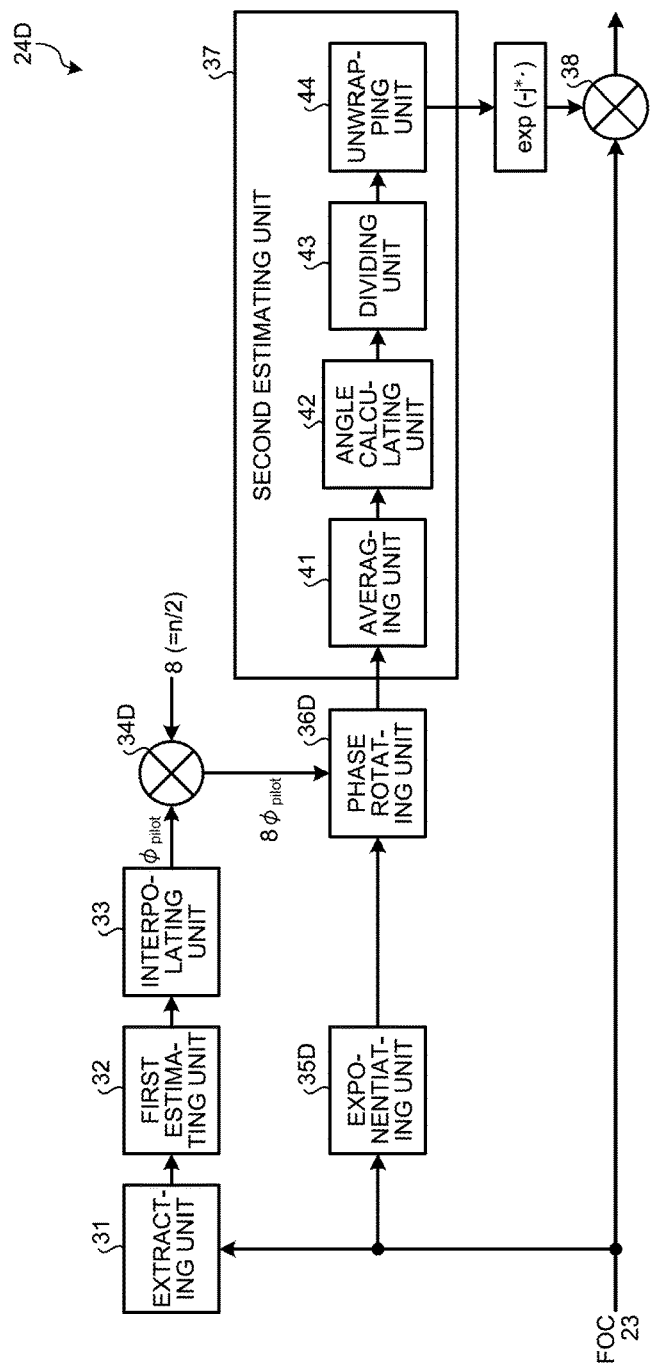
FIG. 17 is a block diagram that illustrates an example of the functional configuration of a CPR with regard to the receiving device in the 16PSK system according to a sixth embodiment.

Although the optical transmission system 1 with the nPSK system is described as an example of the optical transmission system 1 according to the above-described first embodiment, an embodiment in a case where the 16PSK system is used is explained below as a sixth embodiment. FIG. 17 is a block diagram that illustrates an example of the functional configuration of a CPR 24D with regard to the receiving device 3 in the 16PSK system according to the sixth embodiment. Furthermore, the same components as those of the optical transmission system 1 according to the first embodiment are attached with the same reference numerals, and duplicated explanations for their configurations and operations are omitted.

[f] Sixth Embodiment

As the CPR 24D, illustrated in FIG. 17, uses the 16PSK system, it includes the extracting unit 31, the first estimating unit 32, the interpolating unit 33, a calculating unit 34D, an exponentiating unit 35D, a phase rotating unit 36D, the second estimating unit 37, and the compensating unit 38.

The extracting unit 31 extracts a PS from a received signal in the 16PSK system. The first estimating unit 32 compares the extracted PS with the predetermined pattern of the PS and estimates a phase error of the PS from a comparison result. Furthermore, the first estimating unit 32 may perform an average process by using phase errors before and after the estimated phase error to reduce gaussian noise, and changes may be optionally made. The first estimating unit 32 outputs a phase error of the PS to the interpolating unit 33. The interpolating unit 33 conducts interpolation on the phase error of the PS, corresponding to the time slot of the data symbol, with a time area and outputs the phase error of the PS after the interpolation process to the calculating unit 34D. The calculating unit 34D multiplies the phase error ϕpilot of the PS by 8(=n/2) and outputs the reference phase 8ϕpilot to the phase rotating unit 36D.

As it is the 16PSK system, i.e., n=16, the exponentiating unit 35D raises the received signal to the power of n/2. Specifically, the exponentiating unit 35D raises the received signal to the power of 8, thereby consolidating the constellation points at 16 areas on the IQ plane into the neighborhood of the constellation points at 2 areas, which have a 180-degree relation. The exponentiating unit 35D outputs the constellation points at two areas after exponentiation by 8 to the phase rotating unit 36D. The phase rotating unit 36D compares the phases of the constellation points at two areas after phase rotation with the reference phase 8ϕpilot and, if a phase difference is equal to or more than ±90 degrees, rotates the constellation point with equal to or more than ±90 degrees by 180 degrees to consolidate it into the neighborhood of the constellation point at one area.

FIG. 18 is an explanatory diagram that illustrates an example of the transition of the constellation before and after exponentiation by n/2 on the 16PSK signal and before and after phase rotation. The constellation of the 16PSK signal in FIG. 18(A) is in a state before the exponentiating unit 35D conducts exponentiation by 8, i.e., a state where there are constellation points at 16 areas. The constellation of the 16PSK signal in FIG. 18(B) is in a state after the exponentiating unit 35D conducts exponentiation by 8, i.e., a state where the constellation points at 16 areas before exponentiation by 8 have been consolidated into the constellation points at 2 areas after exponentiation by 8. The constellation of the 16PSK signal in FIG. 18(C) is in a state where a constellation point with a phase difference of equal to or more than ±90 degrees with respect to the reference phase has been rotated by 180 degrees by the phase rotating unit 36D so that it has been consolidated into the neighborhood of the constellation point at one area.

The averaging unit 41 of the second estimating unit 37 averages a constellation point at one area after the phase rotating unit 36D conducts phase rotation. Based on arctan (Q/I) of the I component and the Q component of the averaged constellation point at one area, the angle calculating unit 42 of the second estimating unit 37 calculates the argument φ of the constellation point by multiplication of 8(=n/2). The dividing unit 43 of the second estimating unit 37 multiplies the 8(=n/2)-fold argument 8φ by ⅛(=1/(n/2)) to calculate a carrier-wave phase estimate value. The unwrapping unit 44 of the second estimating unit 37 corrects the carrier-wave phase estimate value such that the difference between the carrier-wave phase estimate value with regard to the previous input symbol and the current carrier-wave phase estimate value becomes smaller. The compensating unit 38 multiplies the received signal by the carrier-wave phase estimate value to compensate for a phase error of the received signal.

The CPR 24D according to the sixth embodiment extracts a PS from the received signal, estimates a phase error of the extracted PS, and calculates the reference phase from the phase error of the PS. Furthermore, through exponentiation by 8 on the received signal with the 16PSK system, the CPR 24D consolidates the constellation points at 16 areas into the constellation points at 2 areas that have a 180-degree relation. Furthermore, the CPR 24D compares the phases of the constellation points at two areas with the reference phase and conducts 180-degree phase rotation on the constellation point with a phase difference of equal to or more than ±90 degrees so that the constellation point with a phase difference of equal to or more than ±90 degrees is consolidated into the other constellation point. The CPR 24D estimates a carrier-wave phase estimate value on the basis of the consolidated constellation point and, based on the estimated carrier-wave phase estimate value, compensates for a phase error of the received signal. As a result, phase errors of a received signal in the 16PSK system may be compensated.

The exponentiating unit 35D of the CPR 24D conducts exponentiation by 8 on received signals in the 16PSK system, thereby consolidating constellation points at 16 areas into constellation points at 2 areas. As a result, it is possible to prevent the occurrence of phase slip.

The phase rotating unit 36D in the CPR 24D conducts phase rotation such that the constellation point, which is included in the constellation points at two areas, consolidated by the exponentiating unit 35D, is consolidated into the neighborhood of the constellation point at one area in the vicinity of the reference phase. As a result, constellation points at two areas may be consolidated into the neighborhood of the constellation point at one area.

Furthermore, as it is the 16PSK system, the exponentiating unit 35D according to the above-described sixth embodiment conducts exponentiation by n/2, i.e., 8(=16/2), on the received signal, thereby consolidating constellation points at 16 areas into constellation points at 2 areas. However, the exponentiating unit 35D may conduct not only n/2 but also n/a (a=an integer less than n) on a received signal and, for example, it may be exponentiation by n/4 or n/8. As the number of times for exponentiation is reduced, the range within which a phase may be estimated becomes wider, and calculation operations of the phase rotating unit 36D become complicated; however, changes may be optionally made.

Figure 19A:
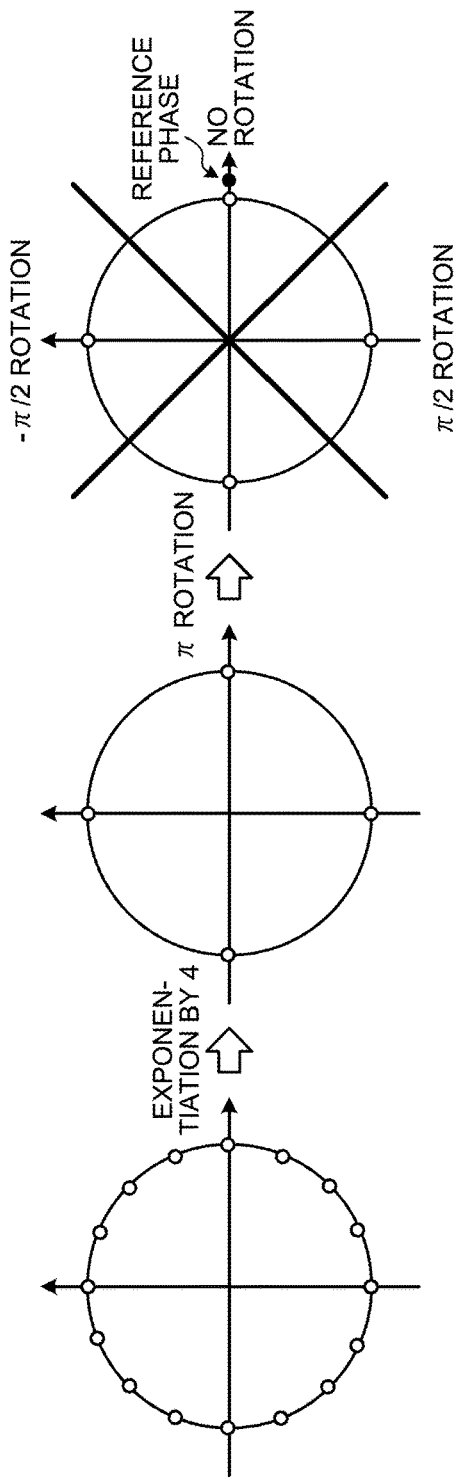
FIG. 19A is an explanatory diagram that illustrates an example of the transition of the constellation before and after exponentiation by n/4 on the 16PSK signal and the reference phase.

FIG. 19A is an explanatory diagram that illustrates an example of the transition of the constellation before and after exponentiation by n/4 on the 16PSK signal and the reference phase. The constellation of the 16PSK signal in FIG. 19A is in a state where there are constellation points at 16 areas with regard to a 16PSK received signal before exponentiation by 4(=n/4). If the exponentiating unit 35D conducts exponentiation by 4(=n/4) on a received signal, the constellation point at 16 areas are consolidated into the constellation points at 4 areas, as illustrated in FIG. 19A. The phase rotating unit 36D determines whether the constellation points at 4 areas include a constellation point with a phase difference of equal to or more than ±45 degrees with respect to the reference phase. If there is a constellation point with a phase difference of equal to or more than ±45 degrees with respect to the reference phase, the phase rotating unit 36D conducts phase rotation on each constellation point with a phase difference of equal to or more than ±45 degrees so that each constellation point with a phase difference of equal to or more than ±45 degrees is consolidated into a constellation point with a phase difference of less than ±45 degrees with respect to the reference phase. As a result, the phase rotating unit 36D may consolidate constellation points at 4 areas after exponentiation by n/4 into the neighborhood of the constellation point at one area.

FIG. 19B is an explanatory diagram that illustrates an example of the transition of the constellation before and after exponentiation by n/8 on the 16PSK signal and the reference phase. The constellation of the 16PSK signal in FIG. 19B is in a state where there are constellation points at 16 areas with regard to a 16PSK received signal before exponentiation by 2(=n/8). If the exponentiating unit 35D conducts exponentiation by 2(=n/8) on a received signal, the constellation point at 16 areas are consolidated into the constellation points at 8 areas, as illustrated in FIG. 19B. The phase rotating unit 36D determines whether the constellation points at 8 areas include a constellation point with a phase difference of equal to or more than ±22.5 degrees with respect to the reference phase. If there is a constellation point with a phase difference of equal to or more than ±22.5 degrees with respect to the reference phase, the phase rotating unit 36D conducts phase rotation on each constellation point with a phase difference of equal to or more than ±22.5 degrees so that each constellation point with a phase difference of equal to or more than ±22.5 degrees is consolidated into a constellation point with a phase difference of less than ±22.5 degrees with respect to the reference phase. As a result, the phase rotating unit 36D may consolidate constellation points at 8 areas after exponentiation by n/8 into the neighborhood of the constellation point at one area.

Figure 20:
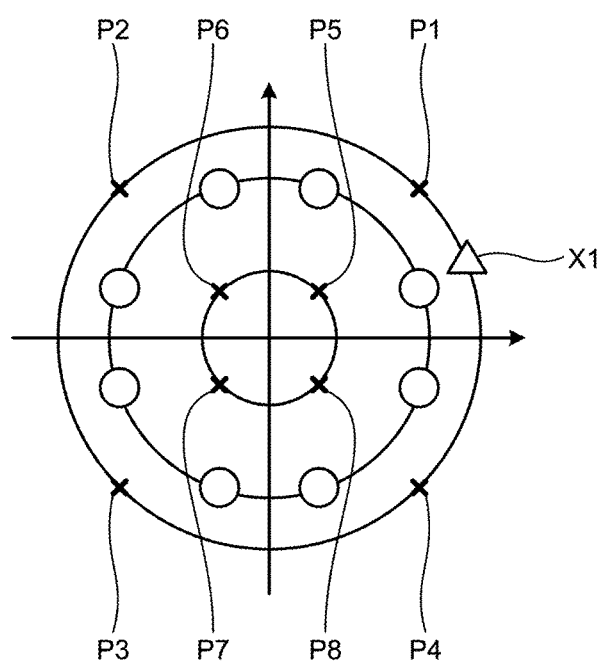
FIG. 20 is an explanatory diagram that illustrates an example of the constellation that is used for exponentiation by n/2 on 16QAM signals.

Furthermore, although the phase modulation method with the nPSK system is described by an example for the optical transmission system 1 according to the above-described first embodiment, it is applicable to for example the phase-amplitude modulation method with the 16QAM system. In this case, it is possible to use QPSK-Partitioning Viterbi-Viterbi algorithm (exponentiation by 4) or exponentiation by 2 in QPSK-Partitioning. FIG. 20 is an explanatory diagram that illustrates an example of the constellation that is used for exponentiation by n/2 on 16QAM signals. The exponentiating unit 35 conducts exponentiation by 4 on a received signal with the 16QAM system so that the constellation points at 16 areas with the 16QAM system are consolidated into constellation points P1 to P8 (illustrated with the mark x) at 8 areas that have a relation of the integral multiple of 90 degrees. Here, the reference phase of the PS is a constellation point X1 (illustrated with the mark Δ) at one area. As a result, in order to consolidate the constellation points P1 to P4 at 4 areas into the neighborhood of the constellation point P1 at one area, the phase rotating unit 36 conducts phase rotation on each of the constellation points P2 to P4 on the basis of the reference phase X1. Simultaneously, in order to consolidate the constellation points P5 to P8 at 4 areas into the neighborhood of the constellation point P5 at one area, the phase rotating unit 36 conducts phase rotation on each of the constellation points P6 to P8 on the basis of the reference phase X1. As a result, the phase rotating unit 36 may consolidate the constellation points at 8 areas after exponentiation by 4 into the constellation points P1 and P5 at 2 areas.

Figure 21:
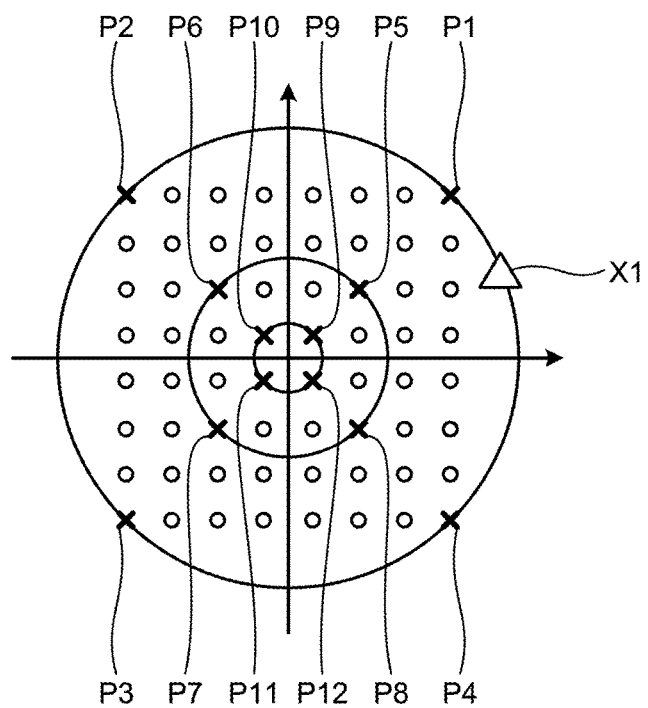
FIG. 21 is an explanatory diagram that illustrates an example of the constellation that is used for exponentiation by n/2 on 64QAM signals.

The present embodiment is applicable to for example the phase-amplitude modulation method with the 64QAM system. In this case, it is possible to use QPSK-Partitioning Viterbi-Viterbi algorithm (exponentiation by 4) or exponentiation by 2 in QPSK-Partitioning. FIG. 21 is an explanatory diagram that illustrates an example of the constellation that is used for exponentiation by n/2 on 64QAM signals. The exponentiating unit 35 conducts exponentiation by 4 on a received signal with the 64QAM system so that the constellation points at 64 areas in the 64QAM system are consolidated into the constellation points P1 to P12 (illustrated with the mark x in the drawing) at 12 areas that have a relation of the integral multiple of 90 degrees. Here, the reference phase of the PS is the constellation point X1 (illustrated with the mark Δ) at one area. As a result, in order to the consolidate the constellation points P1 to P4 at 4 areas into the neighborhood of the constellation point P1 at one area, the phase rotating unit 36 conducts phase rotation on each of the constellation points P2 to P4 on the basis of the reference phase X1. Simultaneously, in order to consolidate the constellation points P5 to P8 at 4 areas into the neighborhood of the constellation point P5 at one area, the phase rotating unit 36 conducts phase rotation on each of the constellation points P6 to P8 on the basis of the reference phase X1. Furthermore, in order to consolidate the constellation points P9 to P12 at 4 areas into the neighborhood of the constellation point P9 at one area, the phase rotating unit 36 conducts phase rotation on each of the constellation points P10 to P12 on the basis of the reference phase X1. As a result, the phase rotating unit 36 may consolidate the constellation points at 12 areas after exponentiation by 4 into the constellation points P1, P5, and P9 at 3 areas.

Figure 22:
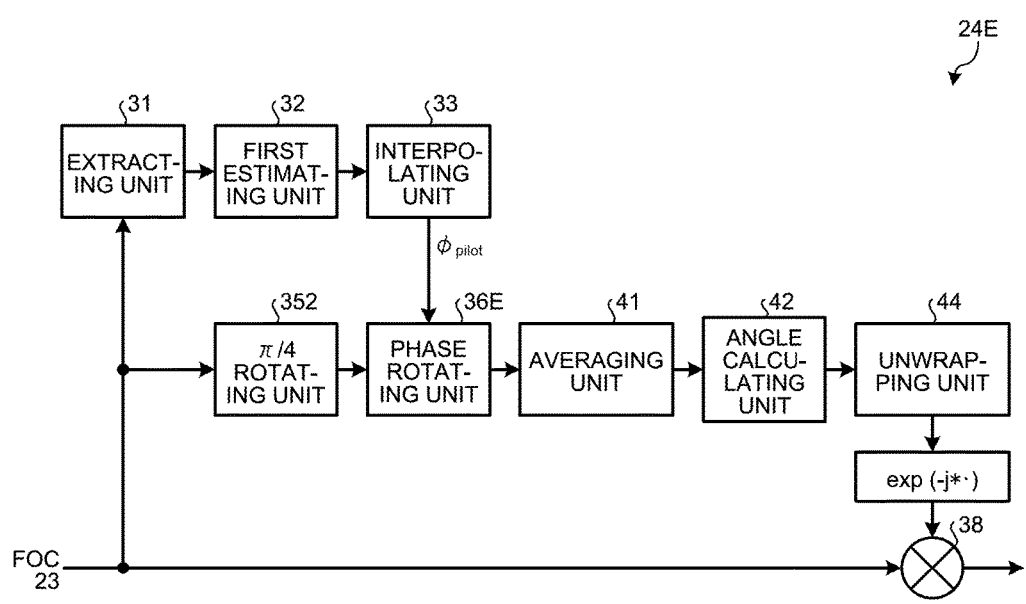
FIG. 22 is a block diagram that illustrates an example of the functional configuration of a CPR with regard to the receiving device with the QPSK system according to a seventh embodiment.

Furthermore, in the CPR 24B with regard to the receiving device 3 with the QPSK system according to the above-described fourth embodiment, the exponentiating unit 35B is provided, and the phase rotating unit 36B conducts phase rotation such that a constellation point, which is included in the constellation points at two areas, consolidated by the exponentiating unit 35B, is consolidated into the neighborhood of the constellation point at one area in the vicinity of the reference phase. However, the phase rotating unit 36B may consolidate four constellation points of a received signal into the neighborhood of the constellation point at one area in the vicinity of the reference phase without consolidating it to two constellation points of the received signal by the exponentiating unit 35B. Thus, an embodiment of the CPR 24B that uses the QPSK system and that does not include the exponentiating unit 35B is explained below as a seventh embodiment. FIG. 22 is an explanatory diagram that illustrates an example of the functional configuration of the CPR 24E with regard to the receiving device 3 with the QPSK system according to the seventh embodiment. Here, the same components as those of the optical transmission system 1 according to the first embodiment are attached with the same reference numerals, and duplicated explanations for their configurations and operations are omitted.

[g] Seventh Embodiment

As the CPR 24E, illustrated in FIG. 22, uses the QPSK system, it includes the extracting unit 31, the first estimating unit 32, the interpolating unit 33, a π/4 rotating unit 352, a phase rotating unit 36E, the averaging unit 41, the angle calculating unit 42, the unwrapping unit 44, and the compensating unit 38.

The extracting unit 31 extracts a PS from a received signal in the QPSK system. The first estimating unit 32 compares the extracted PS with the predetermined pattern of the PS and estimates a phase error of the PS from a comparison result. The first estimating unit 32 outputs the phase error of the PS to the interpolating unit 33. The interpolating unit 33 conducts interpolation on the phase error of the PS, corresponding to the time slot of the data symbol, with a time area and outputs the phase error φpilot of the PS after the interpolation process to the phase rotating unit 36E.

The π/4 rotating unit 352 rotates the constellation points at 4 areas of the received signal by 45 degrees and outputs the constellation point at 4 areas after phase rotation to the phase rotating unit 36E. The phase rotating unit 36E compares the phases of the constellation points at 4 areas after phase rotation with the reference phase φpilot. In accordance with a comparison result, the phase rotating unit 36E consolidates each of the constellation points at 4 areas into the neighborhood of the constellation point at one area under the following phase rotation condition. If the phase rotation condition is −45°≤φdiff<45°, the phase rotating unit 36E determines that the phase of the constellation point is not to be rotated. Here, diff is the phase of the constellation point—the reference phase. If the phase rotation condition is −90°≤φdiff<−45°, the phase rotating unit 36E rotates the phase of the constellation point by 90°. If the phase rotation condition is 135°≤φdiff<225°, the phase rotating unit 36E rotates the phase of the constellation point by 180°. If the phase rotation condition is 45°≤φdiff<135°, the phase rotating unit 36E rotates the phase of the constellation point by −90°. As a result, the phase rotating unit 36E consolidates the constellation points at 4 areas into the neighborhood of the constellation point at 1 area.

Figure 23:
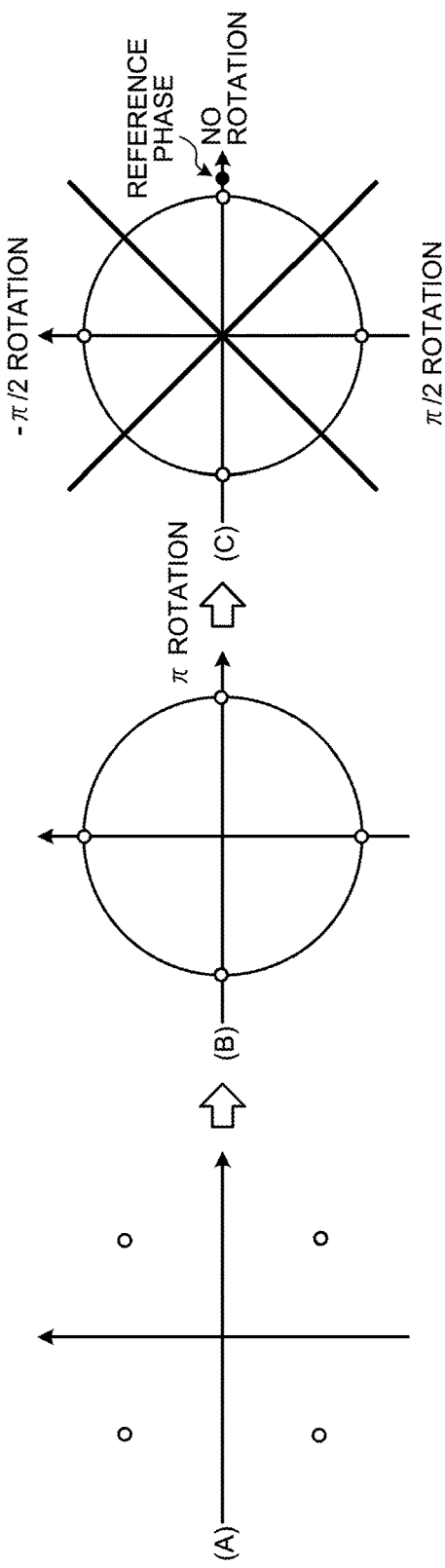
FIG. 23 is an explanatory diagram that illustrates an example of the transition of the constellation before and after rotation by π/4 on the QPSK signal and before and after phase rotation.
Figure 24:
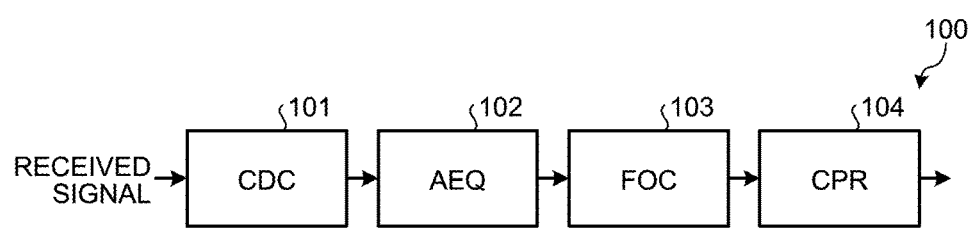
FIG. 24 is a block diagram that illustrates an example of the functional configuration of a DSP.
Figure 25:
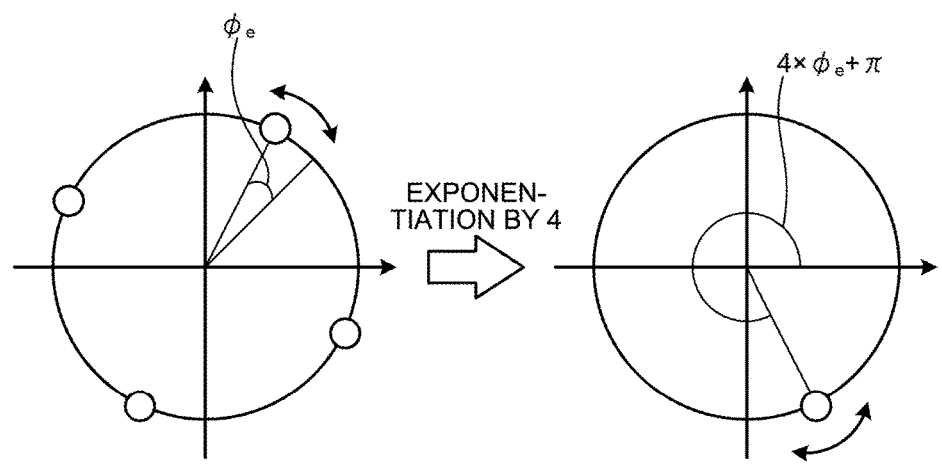
FIG. 25 is an explanatory diagram that illustrates an example of the constellation (there is phase noise) after exponentiation by n on the QPSK signal.

FIG. 23 is an explanatory diagram that illustrates an example of the transition of the constellation before and after rotation by π/4 on the QPSK signal and before and after phase rotation. The constellation of the QPSK signal in FIG. 23(A) is in a state before rotation by π/4, i.e., a state where there are constellation points at four areas. The constellation of the QPSK signal in FIG. 23(B) is in a state after rotation by π/4, i.e., a state where the constellation points at four areas before rotation by π/4 have been consolidated into the constellation points at four areas after rotation by π/4. The constellation of the QPSK signal in FIG. 23(C) is in a state where the constellation points at 4 areas, having been rotated by 90 degrees by the π/4 rotating unit 352, have been consolidated into the neighborhood of the constellation point at one area.

The averaging unit 41 averages a constellation point at one area after the phase rotating unit 36B conducts phase rotation. Based on arctan(Q/I) of the I component and the Q component of the averaged constellation point at one area, the angle calculating unit 42 calculates the argument φ of the constellation point. Furthermore, the unwrapping unit 44 calculates the argument φ of the constellation point as a carrier-wave phase estimate value and corrects the carrier-wave phase estimate value such that the difference between the carrier-wave phase estimate value with regard to the previous input symbol and the current carrier-wave phase estimate value becomes smaller. The compensating unit 38 multiplies the received signal by the carrier-wave phase estimate value to compensate for a phase error of the received signal.

The CPR 24E according to the seventh embodiment extracts a PS from the received signal, estimates a phase error of the extracted PS, and calculates the reference phase from the phase error of the PS. Furthermore, the CPR 24E rotates each of the constellation points at 4 areas of the received signal with the QPSK system by 90°. The CPR 24E compares the phases of the constellation points at four areas with the reference phase and rotates each of the constellation points so that each of the constellation points at 4 areas is consolidated into the neighborhood of the constellation point at one area on the basis of the phase rotation condition. The CPR 24E estimates a carrier-wave phase estimate value on the basis of the consolidated constellation point and, based on the estimated carrier-wave phase estimate value, compensates for a phase error of the received signal. As a result, phase errors of a received signal with the QPSK system may be compensated.

The CPR 24E may compensate for a phase error of the received signal with the QPSK system even though the exponentiating unit 35B does not raise the received signal to the power of n/2.

Furthermore, although the CPR 24E of the receiving device 3, which uses the QPSK system, is illustrated by an example in the seventh embodiment, it is applicable to not only the QPSK system but also the phase-amplitude modulation method with the 16QAM or the 64QAM system as well as the 8PSK system or the 16PSK system. Furthermore, the seventh embodiment is applicable to the third embodiment and, in this case, it is applicable such that the exponentiating unit 35A, illustrated in FIG. 12, is deleted and the phase rotating unit 36A rotates each constellation point so that constellation points of a received signal after compensation by a first compensating unit 39A are consolidated into the neighborhood of the constellation point at one area on the basis of the phase rotation condition.

Furthermore, although the phase modulation method with the nPSK system is illustrated by an example for the optical transmission system 1 according to the present embodiment, it is applicable to the phase modulation method with the 4D-2A8PSK system, which is a four-dimensional phase modulation method (K. Kojima, et al., "Constant Modulus 4D Optimized Constellation Alternative for DP-8QAM," P.3.25, ECOC 2014).

Components of each unit illustrated do not always need to be physically configured as illustrated in the drawings. Specifically, specific forms of separation and combination of each unit are not limited to those depicted in the drawings, and a configuration may be such that all or some of them are functionally or physically separated or combined in an arbitrary unit depending on various types of loads or usage.

Furthermore, all or any of various processing functions performed by each device may be implemented by a central processing unit (CPU) (or a microcomputer such as a micro processing unit (MPU), or a micro controller unit (MCU)). Furthermore, it is self-evident that all or any of various processing functions may be implemented by programs analyzed and executed by a CPU (or a microcomputer such as an MPU or MCU) or by wired logic hardware.

According to the disclosed aspect, a phase error of a received signal may be compensated.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device that receives a received signal in which a data signal, modulated by using a phase modulation method or a phase-amplitude modulation method, and a pilot signal are time-multiplexed, the receiving device comprising:
   a synchronizing circuit that synchronizes a phase of the received signal, wherein
   the synchronizing circuit is configured to:
      extract the pilot signal from the received signal;
      estimate a phase error by comparing the extracted pilot signal and a predetermined pattern of the extracted pilot signal;
      raise the received signal to a power of less than a multi-valued number in the modulation method related to the received signal to consolidate constellation points, corresponding to the multi-valued number, into constellation points of less than the multi-valued number;
      conduct phase rotation on the consolidated constellation points of the received signal in accordance with a reference phase obtained from the estimated phase error, and a phase in the modulation method related to the received signal, so as to remove modulated components in the constellation points of the received signal;
      estimate a phase estimate value of the received signal in accordance with the constellation points, on which the phase rotation has been conducted so as to remove the modulated components; and
      compensate for a phase error of the received signal in accordance with the estimated phase estimate value.

2. The receiving device according to claim 1, wherein the synchronizing circuit is configured to raise the received signal to a power of the multi-valued number/2 in the modulation method related to the received signal to consolidate constellation points, corresponding to the multi-valued number, into constellation points at two areas.

3. The receiving device according to claim 1, wherein
the synchronizing circuit is configured to conduct phase rotation such that each constellation point, included in the consolidated constellation points, is consolidated into a neighborhood of a constellation point in a vicinity of the reference phase.

4. The receiving device according to claim 1, wherein in a case of the received signal in the phase modulation method, the synchronizing circuit is configured to consolidate constellation points, corresponding to the multi-valued number, into constellation points of less than the multi-valued number.

5. The receiving device according to claim 1, wherein in a case of the received signal in the phase-amplitude modulation method, the synchronizing circuit is configured to consolidate constellation points, corresponding to the multi-valued number, into constellation points that are included in the constellation points that correspond to the multi-valued number and that have a relation of an integral multiple of 90 degrees.

6. A phase-error compensation method that is implemented by a synchronizing circuit that synchronizes a phase of a received signal in a receiving device that receives the received signal in which a data signal, modulated by using a phase modulation method or a phase-amplitude modulation method, and a pilot signal are time-multiplexed, the phase-error compensation method comprising:

extracting, by the synchronizing circuit, the pilot signal from the received signal;

estimating, by the synchronizing circuit, a phase error by comparing the extracted pilot signal and a predetermined pattern of the extracted pilot signal;

raising, by the synchronizing circuit, the received signal to a power of less than a multi-valued number in the modulation method related to the received signal to consolidate constellation points, corresponding to the multi-valued number, into constellation points of less than the multi-valued number;

conducting, by the synchronizing circuit, phase rotation on the consolidated constellation points of the received signal in accordance with a reference phase, obtained from the estimated phase error, and a phase in the modulation method related to the received signal, so as to remove modulated components in the constellation points of the received signal;

estimating, by the synchronizing circuit, a phase estimate value of the received signal in accordance with the constellation points, on which the phase rotation has been conducted so as to remove the modulated components; and compensating for a phase error of the received signal in accordance with the estimated phase estimate value, by the synchronizing circuit.

* * * * *